US011090869B2

(12) United States Patent
 Schade

(10) Patent No.: US 11,090,869 B2
(45) Date of Patent: Aug. 17, 2021

(54) METHOD AND APPARATUS FOR GENERATIVELY MANUFACTURING A THREE-DIMENSIONAL OBJECT

(71) Applicant: EOS GmbH Electro Optical Systems, Krailling (DE)

(72) Inventor: Martin Schade, Munich (DE)

(73) Assignee: EOS GmbH Electro Optical Systems, Krailling (DE)

(*) Notice: Subject to any disclaimer, the term of this patent is extended or adjusted under 35 U.S.C. 154(b) by 65 days.

(21) Appl. No.: 15/690,892

(22) Filed: Aug. 30, 2017

(65) Prior Publication Data

US 2018/0065303 A1 Mar. 8, 2018

(30) Foreign Application Priority Data

Sep. 2, 2016 (DE) .......................... 102016216682.4

(51) Int. Cl.
 *B29C 64/364* (2017.01)
 *B33Y 10/00* (2015.01)
 (Continued)

(52) U.S. Cl.
 CPC ............ *B29C 64/364* (2017.08); *B22F 12/00* (2021.01); *B29C 64/153* (2017.08); *B29C 64/25* (2017.08);
 (Continued)

(58) Field of Classification Search
 CPC ... B29C 64/364; B29C 64/153; B29C 64/393; B29C 64/35; B29C 64/25; B29C 64/371;
 (Continued)

(56) References Cited

U.S. PATENT DOCUMENTS 5,837,960 A * 11/1998 Lewis .................... B23K 26/34
 219/121.63
6,583,379 B1 * 6/2003 Meiners ................ B22F 3/1055
 219/121.6
(Continued)

FOREIGN PATENT DOCUMENTS

CN 1993188 A 7/2007
CN 201676846 U 12/2010
(Continued)

OTHER PUBLICATIONS

Chinese Search Report for Application No. 201710797475.1, dated Sep. 28, 2020, 2 pages.

*Primary Examiner* — Francisco W Tschen
*Assistant Examiner* — Guy F Mongelli
(74) *Attorney, Agent, or Firm* — Seyfarth Shaw LLP

(57) ABSTRACT

Disclosed is a method of generating a ceiling gas stream in the course of the generative manufacturing of a three-dimensional object in a process chamber by a layer-by-layer application and selective solidification of a building material within a build area arranged in the process chamber. The process chamber has a chamber wall having a process chamber ceiling lying above the build area. A ceiling gas stream of a process gas is passed through the process chamber which is streaming from the process chamber ceiling towards the build area in a controlled manner. In the course of this, the ceiling gas stream is supplied to the process chamber through ceiling inlets formed in the process chamber ceiling such that the ceiling gas stream is directed substantially perpendicularly to the build area downwards onto the build area as it exits the ceiling inlets.

13 Claims, 15 Drawing Sheets

(51) Int. Cl.
*B33Y 30/00* (2015.01)
*B33Y 50/02* (2015.01)
*B29C 64/153* (2017.01)
*B29C 64/35* (2017.01)
*B29C 64/371* (2017.01)
*B22F 12/00* (2021.01)
*B29C 64/393* (2017.01)
*B29C 64/25* (2017.01)
*B22F 10/10* (2021.01)
*B33Y 70/00* (2020.01)
*B29C 64/268* (2017.01)

(52) U.S. Cl.
CPC ............ *B29C 64/35* (2017.08); *B29C 64/371* (2017.08); *B29C 64/393* (2017.08); *B33Y 10/00* (2014.12); *B33Y 30/00* (2014.12); *B33Y 50/02* (2014.12); *B22F 10/10* (2021.01); *B22F 2999/00* (2013.01); *B29C 64/268* (2017.08); *B33Y 70/00* (2014.12)

(58) Field of Classification Search
CPC ....... B29C 64/268; B33Y 10/00; B33Y 30/00; B33Y 50/02; B33Y 70/00; B22F 3/1055; B22F 2003/1056; B22F 2999/00
See application file for complete search history.

(56) References Cited

U.S. PATENT DOCUMENTS

| | | | |
|---|---|---|---|
| 2008/0023051 A1 | 1/2008 | Yoshimura et al. | |
| 2010/0101490 A1 | 4/2010 | Bokodi et al. | |
| 2012/0060649 A1* | 3/2012 | Malekzadeh | B22F 9/08 75/336 |
| 2014/0370323 A1* | 12/2014 | Ackelid | B22F 3/1055 428/548 |
| 2015/0017054 A1* | 1/2015 | Jakimov | G01N 27/72 419/53 |
| 2015/0283649 A1 | 10/2015 | Amaya et al. | |
| 2015/0367573 A1 | 12/2015 | Okazaki | |
| 2015/0367574 A1 | 12/2015 | Araie et al. | |
| 2016/0052079 A1* | 2/2016 | Ackelid | B22F 3/1055 419/55 |
| 2016/0121398 A1 | 5/2016 | Schlick | |
| 2016/0136731 A1 | 5/2016 | McMurtry et al. | |
| 2016/0175930 A1* | 6/2016 | She | B22F 1/0085 427/455 |
| 2016/0200052 A1* | 7/2016 | Moore | B29C 64/245 264/401 |
| 2018/0126650 A1* | 5/2018 | Murphree | B29C 64/35 |

FOREIGN PATENT DOCUMENTS

| | | | | |
|---|---|---|---|---|
| CN | 102123850 A | 7/2011 | | |
| CN | 104972117 A | 10/2015 | | |
| CN | 105268971 A | 1/2016 | | |
| CN | 105451970 A | 3/2016 | | |
| DE | 19853947 C1 | 2/2000 | | |
| EP | 2862651 A1 | 4/2015 | | |
| EP | 3147047 A1 * | 3/2017 | ........... B29C 64/153 |
| EP | 3147047 A1 | 3/2017 | | |
| WO | 1992008592 A1 | 5/1992 | | |
| WO | 2014199150 A1 | 12/2014 | | |

* cited by examiner

METHOD AND APPARATUS FOR GENERATIVELY MANUFACTURING A THREE-DIMENSIONAL OBJECT

TECHNICAL FIELD OF THE INVENTION

The present invention concerns a method of generatively manufacturing a three-dimensional object in a process chamber of a generative manufacturing apparatus by a layer-by-layer application and selective solidification of a building material within a build area arranged in the process chamber. In the course of this, while the object is being manufactured, a process gas stream is supplied to the process chamber which streams through the process chamber and is then discharged from the process chamber. The invention is also directed to an apparatus designed and/or controlled to preferably automatically execute such a method as well as to a control unit designed to generate corresponding control commands. The present invention particularly concerns methods and apparatuses in which the building material is provided in powder form.

BACKGROUND OF THE INVENTION

Methods and apparatuses for generatively manufacturing three-dimensional objects are also known as "Additive Manufacturing" or "generative fabrication" methods and apparatuses. In the course of this, an object is typically built up layer by layer within a build area on a vertically adjustable building support. To this aid, a respective layer of a building material is applied onto the building support or, respectively, a pre-existing layer and selectively solidified in a region corresponding to a cross-section of the object to be manufactured. These steps take place in a process chamber of the manufacturing apparatus which is arranged in a machine housing of the manufacturing apparatus. An example of such a method is the "selective laser sintering or melting", wherein the selective solidification of the building material is effected by scanning the respective layer by a laser beam. Frequently, a manufacturing container forms a boundary frame for the building material inside the process chamber by laterally confining the building material on the vertically adjustable building support. In this case, an area bordered by the upper edge of the manufacturing container is normally understood as a build area. In practice, the respective top layer of the building material can often also be applied beyond the edge of the build area thus defined; however, the building material applied outside of the build area does not conduce to the object manufacturing and is therefore neither selectively solidified nor subsequently lowered together with the building support.

Depending on the kind of the building material used, in particular when sintering or melting plastic or metal powder, undesired impurities, such as splash, fumes, smoke, vapours and/or gases, may be generated during the process of selective solidification, which propagate into the process chamber. When a building material in powder form is used, impurities may be additionally generated by swirling up powder or powder dust in the process chamber, e.g. caused by irregularities in the metering or application process or by a local gas stream impulse onto a powder portion being too strong. Impurities can adversely affect the manufacturing process, e.g. by absorbing, scattering, or deflecting the scanning laser beam, deposit on a coupling window for the laser beam, or settle on a building material layer, whereby disturbing inclusions can be generated by the subsequent solidification or the application of the successive layer can be impaired.

To meet high quality and efficiency requirements on the manufacturing process, such impurities thus need to be removed as fast as possible from the process point at which it is generated. In doing so, it needs to be particularly avoided that the impurities get into a path of the solidification radiation again and/or at another location in the process chamber. With multi-scanner-systems, in which several solidification units such as laser are used, there is, furthermore, a risk of impurities from the processing region of one laser beam getting into the path of another laser beam and thus interfering with the process of the latter. Besides, an increasing number of the active laser beams leads to an increasing impurity rate in the process chamber, which makes an improved removal of the impurities necessary, again.

In EP 2 862 651 A1, for instance, removal of such impurities is described for a multi-scanner-machine having four irradiation units. Here, the area of a raw material carrier on which an object is built up is subdivided into four overlapping quadrants each of which is irradiated by one irradiation unit, respectively. While the object is manufactured, it is proposed to supply fresh gas to the process chamber by means of a gas inlet ending closely above a central region of the raw material carrier in a nozzle. In the course of this, the nozzle is closed downwards in the direction to the carrier and lets the gas stream out only laterally through openings of a ring-shaped baffle plate. However, with this gas inlet configuration, impurities above the central region of the raw material carrier, i.e. directly under the nozzle, cannot be effectively removed.

Further, generative manufacturing apparatuses are known to the applicant where, for removing impurities from the process chamber, a gas stream is generated which vertically, centrally impinges on an upper layer of the building material within a circular or an elongate, approximately rectangular impingement area and is laterally deflected thereby. Also these gas stream configurations result in problem zones of insufficient removal of impurities in the process chamber, as illustrated in FIGS. 3 and 4:

A circular impingement area A1 of the gas stream in the build area 10 (FIG. 3) typically results in that, as the gas volume spreads (as indicated by arrows) along the build area 10 after the impingement, the velocity (indicated by the respective arrow length) of the gas stream rapidly decreases with the increasing distance R from the centre $Z_0$ of the build area, this fact being caused by a rapidly (proportionally to R) increasing area of the rings marked by dashed lines, in which the gas volume radially expands in an outward direction. This fact is made clear once more in the figure on the left. Therefore, when a circular impingement area A1 is small in comparison to the build area size, the rapidly decreasing velocity (and density) of the gas stream does not suffice to effectively remove impurities over long distances as far as the edge of the build area. If a velocity of the gas stream injected into the process chamber is increased to such an extent that a removal of impurities over a long distance is improved, it may result in high velocities of the gas stream directly after the impingement within the build area, which can lead to a detrimental blowing of the building material.

An elongate, approximately rectangular or, alternatively, strip-shaped impingement area A2 (FIG. 4) of the gas stream within the build area 10 brings about problem zones P1, P2 of too low or non-uniformly directed removal of impurities, the problem zones P1, P2 being formed centrally at each long side L of the impingement area in a specific distance d therefrom. The reason for this is, inter alia, a strong/extreme curvature at both ends E1, E2 of the strip A2. Here, the area in which a gas volume of the impinging gas stream can spread in almost all directions (as indicated by arrows) increases approximately proportionally to a square radius from the respective impingement point E1, E2. This leads to considerably lower pressure conditions and velocities in the region of the ends of the impingement area A2 than at its long sides L, where the impinging gas volume portions can flow off the respective long side only in one direction perpendicular to this long side directly after the impingement. As a consequence of the corresponding higher pressure and higher velocities in these regions, gas volume portions impinging at the long sides of the impingement area A2 drift not only to the regions having the ambient pressure, but also towards the two ends E1, E2 while further flowing off. Therefore, centrally at the distance d from the impingement area A2 two zones P1, P2 of lower velocities and diverging flow directions are formed. In these problem zones, impurities are insufficiently removed again.

In DE 198 53 947 C1, a process gas flows horizontally through a shallow process chamber in a channel formed by a building plane and a chamber cover extending at a height of 20 cm from the building plane. For protecting a laser beam coupling window from impurities, it is additionally proposed to arrange the coupling window in a chamber cover portion which is elevated specifically for this purpose. A second process gas stream having a lower density is supplied into the process chamber through inlet openings arranged directly under the coupling window in vertical side walls of the elevated portion in a ring-shaped manner. With this configuration, partial streams of the second process gas as well as the former gas stream partly flow at 90° to 180° against one another. Thereby, disturbing gas turbulences or up winds may be generated in zones of the process chamber which are not directly acted upon by the two main streams. The removal of impurities is hindered in such zones, again.

SUMMARY OF THE INVENTION

Therefore, it is the object of the present invention to provide an improved method and an improved apparatus of the type indicated at the beginning which can make it possible to considerably raise the effectiveness and the completeness of the removal of disturbing impurities generated during the selective solidification of the building material from the process chamber. In the course of this, in particular, problem zones of insufficient removal of impurities in the process chamber known from the prior art shall be reduced.

This object is achieved by a manufacturing method of claim 1, a control unit of claim 14, and a manufacturing apparatus of claim 15. Further developments of the invention are provided in the dependent claims. In the course of this, the manufacturing apparatus and the control unit may be further specified by the method features described herein below and provided in the claims, and vice versa. Features of different advantageous further developments and embodiments can further be combined among each other.

A first aspect of the invention is a method of generatively manufacturing a three-dimensional object in a process chamber of a generative manufacturing apparatus by a layer-by-layer application and selective solidification of a building material within a build area arranged in the process chamber. In the course of this, while the object is being manufactured, a process gas is supplied to the process chamber by means of a gas supply device and is discharged from the process chamber via an outlet. The gas supply device according to the invention is designed and/or arranged relatively to the build area and/or controlled such that a gas stream of the process gas streaming through the process chamber is shaped in such a manner that a substantially elongate oval impingement area of the gas stream is generated within the build area.

Both the term "gas stream" and the generation of the impingement area according to the invention within the build area require that the process gas forming the gas stream streams into the process chamber at a velocity at which an inlet portion of the gas supply device can have a jet shaping effect according to the invention in an adequate manner and the gas stream can actually stream in a controlled manner in the respective direction as far as the build area if it is not further deflected as it passes through the process chamber after exiting the gas supply device. In the course of this, the above-mentioned control or steering of the streaming behaviour of the gas stream according to the invention is carried out by the shape-giving properties of the gas supply device according to the invention which are firstly generally described above and are described in more detail below.

Therefore, in the context of the invention, an "impingement area" is understood as that area within the build area which is or would have been hit by the gas stream if, after exiting the gas supply device, it streams or streamed in the process chamber as far as the build area in a controlled manner without being further deflected. In cases without a further deflection of the gas stream after it has exited the gas supply device, the impingement area, thus, corresponds to that region of the top building material layer in which region the gas stream impinges onto the layer and is laterally deflected by the layer. At the same time, a size of the impingement area may, for instance, be determined as a function of an impact pressure generated by the gas stream within the build area, as will be described in more detail further below.

An actual impingement of the gas stream on the building material is not necessarily required in the context of the invention. The method according to the invention rather also comprises cases where the gas stream is partially or completely laterally deflected already before reaching the top building material layer by further measures, such as suction caused by the outlet. In these cases, the impingement area according to the invention is determined according to the above definition in an abstract manner, e.g. by projecting (generally no orthogonal projection) a three-dimensionally formed gas stream shaping inlet portion (in the following short: inlet) of the gas supply device onto the build area. Among possible criteria of the gas stream and the resulting impingement area shaping according to the invention are the geometry of the process-chamber-sided inlet opening area and its orientation with respect to the build area, the geometry of an inner wall of the inlet, e.g. widening or, alternatively, narrowing and thus bundling relatively to a pipe cross-section of the process gas piping, particularly distance and ratio of a cross-section of the process gas piping and a cross-section of the process-chamber-sided inlet opening, as well as a distance of the inlet from the build area and a velocity of the gas stream.

A size of the impingement area may be, for instance, determined as depending on an impact pressure generated by the gas stream within the build area. Here, the term "impact pressure" is understood to mean a dynamic pressure generated by the gas stream due to an accumulation of the stream at a solid object, e.g. a top powder layer within the build area. Here, during operation, an impact pressure of the gas stream at the impingement area is typically higher than the ambient pressure in the process chamber. If the impact pressure value measured directly at the inlet portion of the gas supply device is set to be 100%, an impact pressure value in the region of the impingement area may amount to just 50% or 30% of the initial value for a specific velocity of the gas stream since a partial volume of a non-guided gas stream may also spread into regions having ambient pressure which are not lying on a continuation of its initial direction. This expanding or fraying of a non-guided gas stream over a distance may at least partially lead to a pressure or velocity loss. Consequently, on the one hand, a different distribution of impact pressure values over the impingement area may be generated and, on the other hand, an impingement area may be respectively differently sized and respectively differently shaped if a predetermined impact pressure value is assumed.

The impingement area being "substantially elongate oval" quite generally means that it is elongate and rounded. It may have a regular, e.g. elliptic, shape or, alternatively, be irregularly shaped. Concerning the geometric shape of the impingement area, "substantially" means here and in the following that minor deviations from a specific geometric shape caused by construction —e.g. by construction of the gas supply device,—are also comprised. In particular, the impingement area according to the invention may represent an enveloping contour of several partial areas lying quite closely to one another and, as the case may be, overlapping with one another, i.e. it is only the enveloping contour that has the elongate oval shape according to the invention. This may, for instance, be the case when several individual process-chamber-sided openings of the gas supply device lying quite closely to one another are provided.

Furthermore, regions of different magnitudes of impact pressure and different magnitudes of impingement velocities may be present within the impingement area according to the invention, wherein—as the case may be, locally and/or limited in time—values of an impact pressure and an impingement velocity of a partial stream of the gas stream may also amount to 0. This may be due to a heterogeneous jet profile of the gas stream, which may be caused by a corresponding shaping of the gas stream by the gas supply device and/or as a consequence of a deflection of the gas stream as it passes through the process chamber towards the build area. In the course of this, a deflection may be e.g. effected by specific solid elements in the process chamber which at least partially obstruct the gas stream, for instance, a recoater used for the application of the building material, or by one or more further gas streams which, for instance, impinge on the gas stream according to the invention at an acute angle.

It is a crucial advantage of an elongate oval impingement area according to the invention that the problem zones of an insufficient removal of impurities above the build area known from the prior art as mentioned at the outset may be considerably reduced thereby:

In contrast to an impingement area shaped as a rectangle or a straight-lined strip A2 (FIG. 4), an elongate oval impingement area A3 according to the invention (FIGS. 5 to 7) possesses a non-stop curved contour. Thereby, great differences in the pressure and velocity distribution of the gas stream portions at the straight sides, on the one hand, and the sharp ends of the impingement area, on the other hand, be reduced: In the middle of its curved "long sides" L0, an elongate oval impingement area A3 leads to considerably higher gas flow-off velocities as with the straight strip/rectangle A2 (thus, the above-mentioned two problem zones P1 and P2 of a too low or non-uniformly directed removal of impurities are not generated) and thereby effects a considerably more effective removal of impurities in central regions of the build area B. At the same time, the "narrow sides" L1 of the elongate oval impingement area A3, which are softer, less strongly/extremely curved when compared to a strip/rectangle A2, lead to a considerably smaller drop of pressure and velocity of the gas stream in their vicinity.

In contrast to an impingement area shaped as a circle A1 (FIG. 3), an elongate oval impingement area A3 according to the invention (FIGS. 5 to 7) possesses regions having different curvature, leading to the following advantageous effect:

Firstly, a "long side" L0 of the elongate oval A3 (regions of a smaller curvature) is considered in FIG. 5. The length of curved lines which, being concentric here, extend at a certain distance from an outer edge L0 of the elongate oval impingement area A3 increases at a considerably lower rate than in the case of a circular impingement area (cf. FIG. 3) due to a comparatively small curvature. As a consequence, in this region of the build area 10, a given gas volume impinging within the impingement area A3 spreads (as indicated by arrows) into a considerably smaller area (in x/y-direction) than in the case of a circular impingement area. Therefore, in comparison, an impinging gas stream looses only a little of velocity with the increasing distance from the impingement area. This provides for an effective removal of impurities over relatively long distances.

Now, a "narrow side" L1 of the elongate oval A3 is considered in FIG. 6 (regions of a stronger curvature). Here, a spreading of the impinging gas volume is considerably facilitated by the nearly circular curvature of the edge L1 of the impingement area A3 (similarly to FIG. 3). The velocity of the gas stream decreases after the impingement and the subsequent spreading in almost all directions along the build area 10 to an extent determined by the rapid expansion of the area with growing distance from the point of the impingement. As a result, velocity rapidly drops in regions L1 of a strong curvature of the impingement area A3.

Thus, while in the case of a circular impingement area A1 (FIG. 3) the same conditions prevail along the entire edge of the impingement area, the elongate oval impingement area A3 (FIGS. 5-7) according to the invention comprises regions L0 of a smaller and regions L1 of a larger velocity drop during the further spread of the gas stream impinging in these regions. The larger velocity drop at the narrow sides L1 of the elongate oval may be compensated by arranging them close to edges BR of the build area 10 (FIG. 7), whereas the long sides L0 may be arranged comparatively far therefrom since the gas stream is capable of the effective removal of impurities over long distances due to its constantly higher velocity there.

In the method according to the invention, the gas supply device may comprise one or more process-chamber-sided inlet openings.

It may basically be arranged at an arbitrary position in the process chamber and/or at a process chamber wall suited for the gas stream shaping according to the invention.

Further, the gas supply device may basically generate several gas streams in the process chamber. Thus, the gas stream to be shaped according to the invention may be a part of an entire supplied gas volume or, alternatively, comprise the entire supplied gas volume.

The gas stream according to the invention, which generates the elongate oval impingement area within the build area, generally corresponds to a main flow direction of a gas volume supplied to the process chamber via the gas supply device according to the invention and comprises at least 70%, preferably at least 80% and as particularly preferred at least 90% of this gas volume supplied via the gas supply device. Depending on the manner and the position of shaping the gas stream according to the invention, there may, in particular, be further partial gas streams of the gas volume thus supplied which have correspondingly smaller portions, are not directly guided to the build area and do not impinge there, but flow in secondary flow directions through the process chamber.

The invention is not limited to any specific build area shape. In particular, the build area may have a build area edge shaped regularly or, alternatively, irregularly. However, a build area significantly shaped as a rectangle may—particularly in combination with an elongate oval impingement area of the gas stream being aligned along a long side of the rectangle and an outlet being preferably compatibly designed—be, inter alia, advantageous due to the constructional simplicity.

On the other hand, the geometric arrangement and design of the outlet relatively to the impingement area according to the invention can considerably affect the removal of impurities. In the method according to the invention, the outlet may comprise one or more process-chamber-sided outlet openings and may basically be arranged at an arbitrary position within the process chamber or in a process chamber wall. Advantageous embodiments and arrangements will be provided further below.

In the method according to the first aspect of the invention, the elongate oval impingement area is preferably substantially axially symmetrical with respect to a first axis of symmetry. The first axis of symmetry may, for instance, coincide with a central axis of the build area going through a central point of the build area, being, as the case may be, its symmetry axis. Among the advantages of an axially symmetric impingement area, there is, beside the simplicity of the constructional implementation, also a correspondingly substantially symmetrical distribution of the gas stream flowing along the build area after the impingement. The impingement area is particularly preferably additionally substantially axially symmetrical with respect to a second axis of symmetry which is perpendicular to the first axis of symmetry. For example, the impingement area may be substantially elliptical in shape.

The gas stream according to the invention may be at least partially guided inside the process chamber, e.g. by a hose, a pipe etc. having a non-stop wall or having openings. However, preferably at least a portion of the gas stream streams over at least 60%, preferably at least 75%, particularly preferably at least 90% of a first process chamber height in a controlled manner without being guided. Here, the first process chamber height is a distance between the build area and a process chamber ceiling in which the gas supply device is arranged, wherein the distance is in a vertical direction with respect to the build area.

Herein, "non-guided" or "without being guided" means that the gas stream is not determined in its flow direction and/or spread by at least one constructional device, which e.g. comprises a hollow space for conveyance of process gas and is at least partially confined by a border, i.e. comprises, for instance, a tube, a hose, a channel, a nozzle, or the like. The farther the gas stream streams between the process chamber ceiling and the build area in a controlled manner without being guided, the larger is the height ratio of the process chamber which can be freed from impurities by means of the gas stream. Besides, so much the larger portion of the process chamber may be used for other purposes, in particular, for the propagation of a solidification radiation, such as a laser beam.

Basically, an inlet of the gas supply device may be designed in very different ways in order to achieve an elongate oval impingement area according to the invention. In doing so, a process-chamber-sided elongate oval opening area of the inlet is one possibility, it is, however, not necessarily required. With further parameters, such as, for instance, a velocity of the injected gas stream or a three-dimensional design of an inlet geometry, being suitably adjusted, the inlet of the gas supply device may rather have a polygonal, approximately rectangular or circular opening cross-section. The inlet may also have separate channels wherein the sum of impingement areas of the partial streams flowing therefrom to the build area results in an elongate oval impingement area according to the invention.

In an advantageous embodiment of the invention according to the first aspect, the gas stream is shaped by means of an inlet of the gas supply device which inlet comprises a process-chamber-sided elongate oval opening area. Thereby, an elongate oval impingement area within the build area is generated in a simple manner for the gas stream streaming through this opening area into the process chamber. Here, the opening area of the inlet is preferably substantially axially symmetrical with respect to a third axis of symmetry and particularly preferably additionally substantially axially symmetrical with respect to a fourth axis of symmetry which is perpendicular to the third axis of symmetry. Thus, the opening area of the inlet may, for instance, be elliptical. The inlet may, in particular, represent a nozzle.

In this embodiment, the third or fourth axis of symmetry along a longitudinal extension of the opening area of the inlet is parallel to a longitudinal axis of the elongate oval impingement area of the gas stream within the build area. Preferably, an orthogonal projection of this third or fourth axis of symmetry onto the build area coincides with the first or second axis of symmetry of the impingement area of the gas stream. Thus, in this configuration, the main direction of propagation of the gas stream after exiting the inlet is vertically directed downwards towards the build area, so that a substantial portion of the gas stream reaches the build area by the shortest route.

Further, the opening area of the inlet in the above embodiment is preferably substantially and particularly preferably entirely facing the build area. Thereby, it may be, in particular, ensured that substantially the entire gas stream reaches the build area, namely by a route as short as possible. Besides, the generation of zones in the region of the impingement area in which zones a gas volume is standing or moving in an undefined or a roller-like or, respectively, vortex-like manner, due to which a removal of impurities across the build area as fast and as long-range as possible would not be ensured, can be exceptionally effectively reduced thereby.

Alternatively or additionally thereto, here, the inlet is arranged in a process chamber ceiling and preferably does not or does not substantially protrude into the process chamber. Herein, "not substantially" means that the inlet does not extend from the process chamber ceiling downwards into the process chamber by more than approximately 10% of the first process chamber height (the vertical distance between the process chamber ceiling and the build area). An inlet not protruding into the process chamber may, for instance, simply be one or more openings in the process chamber ceiling. An inlet not or not substantially protruding into the process chamber has an advantage of not crossing any path of a solidification device, e.g. a laser.

According to an advantageous further development of the above embodiment, the gas stream is shaped in that an inner cross-section area of the inlet does not increase over its extension in a direction vertical with respect to the build area towards the build area, but preferably rather remains substantially constant. An inner cross-section area which does not increase or, respectively, remains substantially constant has the advantage that a flow velocity of the gas stream does not decrease or, respectively, remains substantially constant as it passes through the inlet. In case of a tapering, an inner cross-section area of the inlet at its process-chamber-sided opening is preferably at least 80% of an inner cross-section area of a gas supply pipe connecting to the inlet.

Since, in the present embodiment, the inlet has a process-chamber-sided elongate oval opening area, whereas a gas supply pipe ending in the inlet typically has a different, often a circular cross-section, the gas stream is partly being concentrated and partly being expanded or, respectively, widened with respect to the (circular) cross-section of the supply pipe while passing through the inlet having a constant inner cross-section. In other words, inlet walls have here an expanding effect on the gas stream in its cross-sectional dimension which is parallel to the longitudinal axis of the elongate oval opening area of the inlet (cf. FIGS. 8, 9a-9d).

An inlet effecting an expansion in such a manner has an important advantage that portions of the gas stream have an impingement angle within the build area which is considerably less steep than approximately 90°. Thereby, firstly, an impact pressure impinged on the building material is reduced in these regions of the impingement area and, secondly, an increased horizontal velocity component of these portions of the gas stream facilitate their directed flow-off towards the build area edge after the deflection. This particularly affects the strongly curved end regions of the elongate oval impingement area, in the vicinity of which the gas stream subsequently experiences the biggest loss of velocity. A further important advantage is a more smooth velocity profile of the impinging gas stream than in case of an inlet without expansion, e.g. in case of inlet inner walls extending vertically to the build area. By a smooth velocity profile of the gas stream during and directly after the impingement within the build area, a powder blowing by the process gas is effectively prevented, which ultimately makes a higher component quality possible.

In this and other embodiments, a jet shaping of the gas stream may take place in a smooth or a non-smooth manner by a suitable design of a process-chamber-side opening and/or an inner wall of the inlet. An inner cross-section of the inlet varying in a direction vertical to the build area may, for instance, be achieved by a suitable direction and convexity of the inlet inner wall between the connection to a gas supply pipe (which, for instance, may be circular) and a process-chamber-side opening (cf. FIGS. 9c-9d). This opening may basically have an arbitrary (in the above embodiment, however, elongate oval) cross-section.

In the course of this, a convexity, curvature, or slope of the inlet inner wall being designed as smooth or continuous as possible is advantageous for the reason that too abrupt a directional change of the gas stream could cause its interruption.

In case of a stall, the gas stream would not be in contact with the inlet inner wall anymore and thus could not be guided by the latter in a defined manner anymore. This could lead to undefined process gas zones and/or turbulences of the process gas inside the process chamber, which should be avoided. Therefore, in the method according to the invention, a guidance of the gas stream inside the process-chamber-sided inlet portion of the gas supply device defined as well as possible is preferably effected by a matching of the flow velocity and the inlet geometry.

According to an advantageous configuration of the above embodiment, the outlet comprises at least one, preferably two elongate opening(s) arranged at opposite sides of the build area which opening(s) extend(s) substantially parallel to a longitudinal axis of the process-chamber-sided opening area of the inlet. By this arrangement, the distance travelled by the impinging gas stream after its deflection along the build area as far as the outlet is minimized. This is because the longitudinal axis of the process-chamber-sided opening area of the inlet and the longitudinal axis of the impingement area according to the invention are parallel to each other in the present embodiment. Both the shortness and a very simple, nearly straight-lined geometry of the gas stream lines between the impingement area and the outlet in this configuration (FIG. 7) contribute to an area-wide effective removal of impurities across the build area.

The at least one elongate outlet opening may, for instance, be a single slit or, alternatively, comprise several slits arranged on top of each other. These slits may, as the case may be, be provided with vertical limitations (control surfaces) for forming a pattern of a plurality of opening areas in order to let the process gas escape through the outlet or suck it in as a uniform stream and, thus, avoid a punctual or concentrated impulse onto the process gas volume. The respective slit may further either be end-to-end or subdivided in its length in separate segments.

In the course of this, an orientation of the opening area(s) of the outlet is preferably substantially vertical to the build area plane. It is particularly preferred that two opening areas lie directly opposite each another at the opposite sides of the build area. A length of the outlet or at least one of its openings may be less than a side length of the build area or approximately correspond to it. However, at least one opening of the outlet preferably extends beyond that, particularly preferably at both ends of the corresponding build area side. Thereby, in particular in configurations where a process chamber wall is at a distance from the build area edge, undesired zones, in which impurities could accumulate or vortices could form, can be reduced or eliminated. In addition, the outlet may also comprise further openings, for instance, at build area sides at which the above-described opening(s) do not lie.

It further turned out that, in the method according to the invention, arranging a process chamber wall and/or the outlet at a distance from a build area edge or a build area side, as the case may be in combination with an extension of the outlet beyond a side length of the build area, advantageously reduces zones in which impurities may collect or turn into undefined turbulences (cf. FIGS. 7 and 11). The distance between the build area edge and the process chamber wall and/or the outlet is then preferably at least approximately 10 cm.

In the method according to the first aspect of the invention, the elongate oval impingement area preferably lies within a central range of the build area covering no more than 60%, preferably no more than 20%, particularly preferably no more than 10% of a total area of the build area. In particular the latter, particularly preferred value "10% at the most" can be determined by an above-described, in general not orthogonal projection of the three-dimensional inner wall geometry of the inlet of the gas supply device according to the invention onto the build area.

The smaller the percentage of this central region within the build area, the larger is the remaining area of the build area over which the gas stream can flow, e.g. parallel thereto, after its deflection and thus contribute to a fast removal of impurities towards the build area edge. A central arrangement of the impingement area within the build area further has an advantage that the gas stream can flow off in all directions along the build area after the impingement, so that all regions of the build area can be basically similarly purged by the gas stream. Besides, by a central arrangement of the impingement area according to the invention within the build area, long routes of respective gas stream portions up to the build area edge are avoided in contrast to a decentralised arrangement. That way, already a single inlet of the gas supply device generating a single central gas stream may provide for a sufficiently effective and fast removal of impurities from the process chamber even for multi-scanner-machines having several solidification units and a correspondingly large build area.

Such a comparatively small impingement area of a central gas stream according to the first aspect of the invention may furthermore lead to an advantageous synergy effect in combination with a ceiling gas stream according to the second aspect of the invention described further below, which is supplied to the process chamber through additional multiple ceiling inlets in a direction substantially perpendicular to the build area. The synergy, firstly, results from substantially the same direction of the central gas stream and the ceiling gas stream, namely substantially vertically towards the build area, which leads to a mutual enhancement of the purging effect according to the invention since an undesired clashing of different process gas streams can be effectively avoided, in comparison to the prior art. Secondly, when a central gas stream is combined with a ceiling gas stream, the respective advantages may prove particularly strong: While the central gas stream provides for a particularly effective removal of impurities along the build area when an impingement area is as small as possible within the build area, impurities in process chamber volumes lying higher above, which such a central gas stream does not directly stream through, may be effectively removed by the ceiling gas stream towards the build area, where, as the case may be, they are captured and entrained by the central gas stream flowing off across the build area towards a build area edge and are thus removed from a region above the build area.

The proportion of the above-mentioned central region and the total area of the build area may depend on a change of the impact pressure over the distance between a central gas inlet into the process chamber and the build area. For instance, in case of a value of at least 10% of that impact pressure which prevails directly at the exit of the inlet through which the gas stream exits the gas supply device towards the build area, the impingement area may cover approximately 5% of the build area. In case of an impact pressure value of at least 5% of the mentioned initial value at the exit of the inlet, the central region may cover approximately 20% of the build area.

In a further advantageous embodiment according to the first aspect of the invention, the gas supply device is designed and/or arranged relatively to the build area and/or controlled such that the gas stream is shaped in such a manner that several elongate oval impingement areas of partial streams of the gas stream are generated within the build area. With regard to at least one and preferably all of these several elongate oval impingement areas, the whole of the above and also subsequent description of the invention addressing a single elongate oval impingement area of the gas stream correspondingly applies.

In this embodiment, the several elongate oval impingement areas of the partial streams have substantially same orientation regarding their longitudinal extension and preferably possess a common axis of symmetry with respect to which each of the several impingement areas is axially symmetrical. At the same time, it is particularly preferred that the common axis of symmetry of the impingement areas coincide with an axis of symmetry of the build area.

The described embodiment makes is possible to advantageously scale the fabrication concept using a few variables. For instance, stringing together elongate oval impingement areas, in particular with a partial overlap, allows to extend the build area in the direction of the common longitudinal orientation (or, as the case may be, a common axis of symmetry) of the impingement areas. Without enlarging the individual impingement area (i.e. while keeping substantially all optimisations and advantages of an individual elongate oval impingement area for the removal of impurities), this embodiment allows to increase the build volume and/or the build rates in a process chamber by a multiple. Here, in particular, an integration of further solidification units (e.g. laser and/or scanner units) for increasing the build rates of the system is possible, for instance, one or two additional solidification units may be added per each further impingement area.

In the method according to the first aspect of the invention, the gas stream preferably impinges within an above-mentioned central region of the build area substantially at a right angle to the build area, particularly at an angle of at least 45°, preferably at an angle of at least 60°, particularly preferably at an angle of at least 70°. Here, "substantially" firstly means that the non-guided gas stream may billow or, respectively, at least temporarily have no permanent shape during the operation of the generative manufacturing apparatus. Secondly, it is a central, inner partial stream of the gas stream according to the invention that impinges onto the build area typically at an angle from 85° to 90°. I.e. the above-mentioned flatter angles generally apply to the margin areas of the gas stream, which have been, for instance, guided and/or shaped by an inlet nozzle. The substantially rectangular impingement of the gas stream within a central region of the build area has an advantage that the gas stream can be subsequently deflected in different directions towards the build area edge under substantially the same conditions. Thereby, a removal of impurities as uniform as possible along the entire build area can be achieved.

With a profile of the gas stream showing an expansion in margin regions in that exterior partial streams of the gas stream have increasingly flatter angles of impingement onto the build area, on the whole, considerably smoother velocities may be achieved at which the individual portions of the gas stream impinge within the build area and subsequently flow further across the build area. Compared to a gas stream jet impinging at a right angle, a gas stream jet impinging at an acute angle and having the same velocity typically generates a lower impact pressure at the point of the impingement. That way, for a removal of impurities from the process chamber atmosphere to be as effective as possible, a high volume flow rate or, respectively, a high velocity of the gas stream may be set, which nevertheless do not go along with locally excessive velocities in the vicinity of the build area, which could lead to an undesired whirling up of powder from a powder bed of the upper building material layer and thus to a reduce of the quality of a build process and a built part.

In the method according to the first aspect of the invention, after impinging within the build area, the gas stream preferably flows substantially parallel to the build area towards an edge of the build area. In the course of this, a deflection of the gas stream impinging within the build area to a substantially parallel flow direction towards the edge of the build area takes place in a lower quarter, preferably a lower sixth, particularly preferably a lower eighth of a second process chamber height corresponding to a distance between the build area and the gas supply device in a direction perpendicular to the build area. In particular, the top build material layer may function as a baffle for the gas stream, which, for instance, deflects the gas stream which approximately perpendicularly impinges thereon by approximately 90°.

Here, "substantially parallel" may mean that not necessarily the total volume of the gas stream is deflected in the same way. Minor deviations from a subsequent parallel flow direction relatively to the build area may be, in particular, present in the middle of the impinging gas stream. It is preferred that at least 50%, preferably 65%, particularly preferably 80% of the gas stream be deflected into a directed stream substantially parallel to the build area.

The distance corresponding to the second process chamber height is the vertical distance between the build area and that region of the process-chamber-sided inlet region of the gas supply device which is nearest to the build area. If this inlet region, for instance, comprises an inlet protruding from the process chamber ceiling towards the build area, such as a nozzle, a tube, or a proboscis, then the above-mentioned distance is measured from that region of the nozzle, tube, or proboscis which is nearest to the build area. The closer to the build area the deflection of the gas stream to the substantially parallel flow direction takes place, the more intensive is the removal of impurities directly above the build area, where most of the impurities mentioned at the beginning are generated.

In the method according to the first aspect of the invention, the outlet is preferably arranged in a lower quarter, preferentially a lower fifth, particularly preferably a lower sixth of the above-mentioned second process chamber height. The closer to the build area in the vertical direction the outlet is arranged, the shorter distances gas stream portions streaming across the build area need to travel until they exit the process chamber. Thereby, impurities are removed from the process chamber by the shortest route, which reduces the risk of a process disturbance by impurities.

Furthermore, the outlet may comprise a suction device in order to suck off the process gas from the process chamber. Such a sucking device may be arranged at an arbitrary position in the process gas piping system. It may, for instance, comprise a turbine or a kind of propeller, which provide for a circulation of the process gas in a gas circuit in which the process gas first streams in a controlled manner through the process chamber and is thereafter transported from the outlet back to the gas supply device according to the invention, wherein suitable filters may cleanse the process gas of impurities while it passes through the pipe system.

In the method according to the first aspect of the invention, the selective solidification is preferably performed by means of a solidification device comprising at least two solidification units. In the course of this, a working area within the build area is assigned to each solidification unit, the working areas being preferably symmetrically arranged with respect to a central plane or central axis going through a central point of the build area perpendicularly to the build area (cf. FIGS. 2, 10a/10b, and 11b). This configuration may, in particular, be advantageously combined with the above-described embodiment having several elongate oval impingement areas of partial streams of the gas stream within the build area.

However, in many cases, a single elongate oval impingement area according to the invention is already sufficient here for an improved removal of impurities from the process chamber. For example, in case of up to four solidification units whose assigned working areas lie around a point of the build area, a single impingement area according to the invention having the same point as its central point may be generated. In other words, in this example, the central point of the impingement area is arranged centrally between the individual working areas or, as the case may be, centrally in the region of overlap of the individual working areas (cf. FIGS. 10b and 11b, in a corresponding sense). Since, after impinging within the build area, the gas stream according to the invention is deflected in all directions away from the impingement area, the process gas flowing off above the build area towards the build area edge respectively streams through only one working area in this configuration. Consequently, the gas stream carries impurities from a working area directly towards the build area edge and not to another working area, so that a multiplication of the number of the solidification units does not lead to an increase of an amount of impurities above a working area. This principle of a central arrangement of impingement areas with respect to working areas can also be correspondingly transferred to cases where several impingement areas are provided.

Providing several solidification units makes it possible, for instance, to enlarge a possible build volume and/or to increase possible build rates by a multiple. In the course of this, a solidification unit may, in particular, be a laser-scanner-unit, or a scanner, or a line irradiation device.

Working areas may be identical regions within the build area, overlap each other, or lie side by side without overlapping. Altogether, the working areas preferably cover substantially the total area of the build area, so that the whole build area may be used for the fabrication. In particular, the working areas may be arranged axially symmetrically to each other within the build area. For example, they can possess a four-fold rotational symmetry with respect to an axis of symmetry which goes through the central point of the build area and is perpendicular to the build area.

In the method according to the first aspect of the invention, the gas supply device preferably comprises at least one fastening device for detachably fastening at least one nozzle for shaping the gas stream. In the course of this, the at least one nozzle is selected in advance from a greater quantity of nozzles which can be fastened by means of the fastening device and the at least one nozzle is fastened by means of the fastening device, wherein, by selecting the at least one nozzle, a flow direction and/or a flow profile of the gas stream in the process chamber is changed. This change of the flow direction may apply to the gas stream according to the invention as a whole, which effects a lateral shifting of its impingement area within the build area. Alternatively or additionally, the change may apply to a partial stream of the gas stream according to the invention, which leads to a change of the geometric shape and/or the size of the impingement area according to the invention.

Alternatively or additionally, the gas supply device preferably comprises at least one switchable nozzle for shaping the gas stream, which nozzle is switchable between a functionless state and a function of injecting the process gas and/or switchable between at least two predefined designs or, respectively, states of a three-dimensional inlet geometry of the nozzle and/or of an opening cross-section and/or of an orientation of a nozzle opening relatively to the build area and/or to a process chamber wall, wherein a suitable combination of at least two of the following parameters is selected and adjusted: (i) inflow velocity of the gas stream into the process chamber, (ii) three-dimensional inlet geometry of the nozzle, (iii) opening cross-section of a nozzle opening, as well as (iv) orientation of a nozzle opening relatively to the build area and/or to a process chamber wall.

The just described methods according to the present invention for configuring the gas supply device are executed individually or in combination with each other, preferably as a function of at least one of the following criteria, particularly preferably automatically: (i) a geometry and/or size and/or arrangement of at least one region to be solidified in a top building material layer within the build area, (ii) a position of a recoater inside the process chamber, (iii) a position of a movable gas supply unit and/or a movable gas discharge unit inside the process chamber, (iv) a position of a movable control surface for guiding the process gas into at least one predefined direction inside the process chamber, (v) selected properties of a building material used in the building process, e.g. a size and/or a weight of powder particles, as well as (vi) a signal of a monitoring device for monitoring the building process, which may be e.g. an error signal. An advantage of these preferred configurations of the method according to the invention is that the gas stream can be very flexibly adapted to changing conditions of the gas flow above the build area and potentially in the whole process chamber, e.g. within the scope of a control system, whereby disturbances of the building process caused by impurities can be further reduced and a permanently high quality of a built component can be provided for.

A second aspect of the invention is a method of generating a ceiling gas stream in the course of the generative manufacturing of a three-dimensional object in a process chamber by a layer-by-layer application and selective solidification of a building material within a build area arranged in the process chamber. In the course of this, the process chamber has a chamber wall having a process chamber ceiling lying above the build area. According to the invention, at least temporarily before and/or during and/or after the manufacturing of the object, a ceiling gas stream of a process gas is passed through the process chamber which is streaming from the process chamber ceiling towards the build area in a controlled manner. The ceiling gas stream according to the invention is supplied to the process chamber through multiple ceiling inlets formed in the process chamber ceiling which are distributed over a region of the process chamber ceiling and which are designed and/or arranged and/or controlled such that the ceiling gas stream exiting the ceiling inlets is directed substantially perpendicularly to the build area downwards onto the build area.

In the course of this, the above-mentioned control or steering of the streaming behaviour of the ceiling gas stream according to the invention is carried out by the properties of the ceiling inlets according to the invention which are firstly generally described above and are described in more detail below.

The process chamber ceiling region over which the ceiling inlets are distributed may be a partial region of the process chamber ceiling with regard to its extension or area, or it may alternatively extend over the overall process chamber ceiling. "Substantially perpendicularly" comprises, in particular, angle ranges of at least 45°, preferably at least 70°, particularly preferably at least 80° with respect to the build area.

By the multiple ceiling inlets of the invention distributed in the process chamber ceiling, multiple partial ceiling streams flowing substantially vertically downwards towards the build area are generated, immediately pushing impurities present in the process chamber atmosphere downwards towards the build area. In this manner, an almost plane vertical process gas stream, a kind of "descending process gas carpet", having an arbitrarily high level of homogeneity may be generated on the whole.

By the ceiling gas stream according to the invention it may, thus, be effectively prohibited that impurities generated while the building material is solidified spread upwards towards the process chamber ceiling. This way, an accumulation of impurities in upper regions of the process chamber and, in particular, a deposition of impurities at a coupling window or another optical device for a radiation needed for the selective solidification may be prevented.

In particular, the method according to the second aspect of the invention may be advantageously combined with the above-described method according to the first aspect of the invention. In other words, the ceiling gas stream according to the invention may be combined with the above-described gas stream having an elongate oval impingement area within the build area (subsequently occasionally subsumed under the term "central gas stream") in the method according to the invention. Since both of these gas streams of the process gas are substantially aligned in the process chamber—namely substantially vertically downwards towards the build area,—they do not disturb one another in their course of flow and, thus, also not in their purging effect. In particular, due to substantially the same direction of the ceiling gas stream and the central gas stream, process gas vortices, which could disturb the removal of impurities, are scarcely generated.

The combination of the two aspects of the invention rather unfolds an advantageous synergy effect since the ceiling gas stream according to the invention and the central gas stream according to the invention mutually support each other in removing impurities from the process chamber. Whereas the elongate oval impingement area of the central gas stream provides for an effective removal of impurities directly above the build area, all remaining volume regions of the process chamber may be excessively kept clear of impurities by the ceiling gas stream in that the ceiling gas stream pushes them downwards towards the build area in an area-wide manner and—with a suitable arrangement of one or more outlets,—pushes them there.

In particular, the central gas stream according to the invention having an elongate oval impingement area may also be considered as a part of the ceiling gas stream according to the invention. This may, for instance, be the case with regard to homogeneous and/or area-wide properties of the ceiling gas stream.

In the method according to the second aspect of the invention, the ceiling inlets are preferably shaped and/or arranged and/or controlled such that the ceiling gas stream is substantially homogeneously shaped in a region of the process chamber. The mentioned region comprises vertically above the build area at least a lowermost tenth, preferably at least a lowermost fifth, particularly preferably at least a lowermost third of a process chamber height measured in a vertical direction from the build area up to the process chamber ceiling. Alternatively or additionally, the mentioned region comprises in a plane of the build area and/or parallel above the build area at least the area of the build area, preferably additionally a surrounding area of the build area, particularly preferably substantially a total area of a process chamber bottom.

A surrounding area of the build area is understood to be a lateral areal extension around the build area, e.g. within a distance of 5 cm around the build area.

The process chamber bottom is understood in the context of the invention as a structure comprising the build area, i.e. concretely a building support mentioned at the beginning or an upper building material layer applied thereto. The process chamber bottom lies under the process chamber ceiling. It is understood as an area in a plane, substantially without a difference in level between the build area and a base plate bordering the build area.

In the course of this, the term "homogeneous" presumes a plane characteristic of the ceiling gas stream without regions in which a process gas volume substantially rests or moves in a different or undefined manner. Further, a substantially equal velocity of a substantially plane ceiling gas stream is presumed. Thus, a continuous downward movement in a defined spatial region of the process chamber results for the process gas streaming in.

The homogeneity can be, for instance, measured as a substantially uniform impact pressure on a predetermined level of height in the process chamber above the build area.

The homogeneity of the ceiling gas stream may, for instance, be influenced by a size and/or a density of the distribution of the ceiling inlets in the process chamber ceiling and/or by a uniform or non-uniform charging of the ceiling inlets with the process gas. Further criteria are, for example, the number of the ceiling inlets, a total opening cross-section area, and cross-sectional shape(s) of the ceiling inlets.

In the method according to the second aspect of the invention, the process chamber preferably has a process chamber bottom lying below the process chamber ceiling, and the build area extends over a partial area of the process chamber bottom.

Further, a distribution of opening cross-section areas of the ceiling inlets at the process chamber ceiling relatively to a total area of the process chamber bottom is substantially uniform, wherein the ceiling inlets are designed and/or arranged and/or controlled such that partial ceiling streams of the ceiling gas stream exiting the ceiling inlets are respectively directed substantially perpendicular to the build area downwards onto the process chamber bottom.

The uniform distribution may, for instance, be achieved by ceiling inlets having the same design and/or opening cross-section area and at least similar distances from one another.

In particular, for a flatly shaped process chamber ceiling with the process chamber ceiling or the process chamber bottom being subdivided into identical quadrants, a similar number of ceiling inlets per quadrant may be provided. There may also be provided a regular distribution of ceiling inlets or, respectively, of opening cross-section areas of the ceiling inlets per unit area of the process chamber ceiling. For example, a ratio of an opening area of the ceiling inlets to a process chamber bottom area may always lie between 1/10 and 1/30, on average be 1/20, with the process chamber bottom being subdivided into 25 or 100 quadrants. In the course of this, the opening cross-section area may be calculated by orthogonally projecting the openings of the ceiling inlets onto the process chamber bottom such that for the ceiling inlets being not completely oriented to the process chamber bottom only a fraction of the actual opening cross-section area is evaluated.

In the course of this, "substantially perpendicular" means that the cross-sections of individual partial streams of the ceiling gas stream may also be expanded, so that e.g. cone-shaped partial streams result.

In the method according to the second aspect of the invention, the ceiling gas stream consisting of partial ceiling gas streams may flow in a substantially laminar manner from the process chamber ceiling in the direction towards the process chamber bottom. In a configuration alternative hereto, a small number of ceiling inlets having a low exit velocity may be provided, so that each individual jet diameter grows and the jets become slightly cone-shaped on the way to the build area.

In the method according to the second aspect of the invention, the ceiling gas stream is preferably passed through the process chamber at least temporarily before and/or during and/or after the selective solidification of the building material, particularly preferably substantially during the whole process of the selective solidification. In the course of this, the ceiling gas stream is preferably also active between two solidification processes, e.g. during an operational break of the solidification process, in order to purge the process chamber atmosphere so that impurities such as smoke cannot billow through the process chamber in an uncontrolled manner but are rather reliably kept in a lower region of the process chamber and/or particularly preferably removed through an outlet device.

In an advantageous embodiment of the method according to the second aspect of the invention, the process chamber ceiling comprises a hollow space having a wall which is substantially closed in an outer wall region turned away from the process chamber and which possesses ceiling inlets in an inner wall region bordering the process chamber. In the course of this, the hollow space serves as an intermediate zone between one or several supply pipes to the hollow space and the ceiling inlets, which guide a process gas volume from the hollow space into the process chamber.

The hollow space is preferably shaped in such a manner, particularly with regard to a suitable height in the direction perpendicular to the build area, that a process gas volume streaming in through the supply line(s) firstly spreads out in the hollow space instead of directly flowing further towards the process chamber through nearby ceiling inlets. To this end, the inner wall surface may have deflector surfaces towards the hollow space opposite to openings of the supply line(s), which preferably deflect an incoming process gas jet in all directions into the hollow space. In an advantageous manner, by filling or, respectively, flooding the hollow space with process gas as extensively as possible prior to a further transport into the process chamber, a homogeneity of the ceiling gas stream may be considerably improved in that partial streams of the gas stream are streaming into the process chamber from the ceiling inlets at a substantially equal velocity. In addition, the hollow space may also lead to a calming of the process gas guided into it in that its velocity is considerably reduced after escaping from the supply pipe(s) before it streams into the process chamber.

The inner wall region may basically cover an arbitrary portion of the area of the process chamber ceiling. Preferably, it is a portion as large as possible, having the advantage of a better flatness and, thus, homogeneity of the ceiling gas stream. The outer wall region being "substantially closed" in particular means that constructional devices such as e.g. supply pipes are an exception.

According to a further development of the above embodiment, the inner wall region is substantially formed by a plate, preferably a perforated plate. In the course of this, the ceiling inlets are at least partly formed by holes of the plate or of the perforated plate. In the course of this, the plate or the perforated plate has at least 10 holes, preferably at least 100 holes, particularly preferably at least 1000 holes. Alternatively or additionally in the course of this, an average opening cross-section area of the holes is not exceeding 10 $cm^2$, preferably not exceeding 2 $cm^2$, particularly preferably not exceeding 0.1 $cm^2$. Also alternatively or additionally in the course of this, a sum of the opening cross-section areas of the holes is not exceeding 20% of a total area of a process chamber bottom, preferably not exceeding 10% of a total area of the process chamber bottom, particularly preferably not exceeding 5% of a total area of the process chamber bottom.

The perforated plate may, for instance, be a stamped or perforated plate or a porous sheet made of an arbitrary material. The perforated plate may also, for instance, represent one or more fine-meshed wire grid, e.g. a filter mat. Alternatively, a cartridge having channels of a suitable length may be used for this, their orientation being substantially identically to the flow direction of the ceiling gas stream substantially perpendicular to the build area. Such channels have the advantage of improving a distribution and shape of the ceiling gas stream by guiding the individual partial ceiling gas streams and additionally reducing turbulences.

In the method according to the second aspect of the invention, at least one ceiling inlet and/or at least one additional gas inlet into the process chamber is preferably designed and/or controlled such that, depending on a spatial configuration of the process chamber and/or on a position and/or size of a device arranged inside the process chamber, a velocity and/or an orientation and/or a jet cross-section of a partial ceiling gas stream streaming out of the ceiling inlet or the additional gas inlet are varied prior to and/or during and/or after the object manufacturing. In the course of this, the additional gas inlet may, for instance, be an inlet of the central gas stream according to the above first aspect of the invention.

This configuration makes it possible to purposefully control inlets such as e.g. nozzles in order to deliberately create in-homogeneous zones inside the process chamber. Such purposefully generated inhomogeneity zones of the ceiling gas stream may e.g. be advantageous in case of specific geometries of the process chamber, for instance, in cases of a craggy or curved configuration of the process chamber wall, or in cases of a variable stream guiding inside the process chamber, such as e.g. by adjustable control surfaces. A selectively higher velocity of specific partial ceiling gas streams or a purposeful and controlled generation of vertices may configure the cleaning and keeping free edges, niches etc. in the process chamber, which would otherwise be insufficiently purged by the process gas, of impurities as more effective.

This is, in particular, also compatible with a homogeneous descending of the process gas above the build area and in a surrounding area of the build area, e.g. within a lateral distance of 5 cm around the build area. When, for example, one or more side walls of the process chamber are curved, a path for partial ceiling gas streams to travel may be longer along the corresponding side wall than in the centre of the build area. Now, for an advantageous "homogeneous" shaping of the descending process gas carpet, a velocity of the partial ceiling gas streams may be adjusted to be higher towards the margin regions in such a manner that the longer route is compensated and the partial ceiling gas streams arriving at the process chamber bottom have a similar or equal velocity.

In an advantageous embodiment of the method according to the second aspect of the invention, the process chamber ceiling has at least one coupling window for coupling a radiation used for the solidification of the building material into the process chamber. Furthermore, in the course of this, the ceiling inlets are substantially uniformly distributed over a total region of the process chamber ceiling except for a region occupied by the at least one coupling window. Beside one or more coupling windows, such an omitted region in the process chamber ceiling may also have, for instance, a camera or further sensor systems for process monitoring.

In a further development of this embodiment, the process chamber ceiling and/or the inner wall region has/have at least one central inlet in a section bordering on the at least one coupling window which central inlet is designed and/or controlled such that, during operation, a central partial ceiling gas stream streams out therefrom towards the build area and is preferably widened in such a manner that the central partial ceiling gas stream converges at its margins towards adjacent partial ceiling gas streams or overlaps with these at least in a lowest tenth, preferably at least in a lowest fifth, particularly preferably at least in a lowest third of the process chamber relating to a process chamber height between the build area and the at least one coupling window lying vertically above it. Thereby, a substantially full-surface gas stream streaming in a controlled manner towards the build area is generated at least across the whole build area and preferably additionally in a surrounding area of the build area.

Here, the ceiling gas stream does not need to be homogeneous with regard to its velocity in the sense of the above definition. For instance, here, the central partial ceiling gas stream may have a higher velocity than the remaining partial ceiling gas streams in order to achieve a particularly effective removal of impurities.

Here, the widening is understood as relating to the cross-section of the partial ceiling gas stream. It may, for instance, take place in a cone-shaped manner in order to also direct the central partial ceiling gas stream into regions of the process chamber in which a process gas volume would otherwise substantially rest or move in an undefined manner since they are not directly charged by a ceiling gas stream which is e.g. streaming out of the hollow space. This may, in particular, be the case for regions lying below a coupling window.

In other words, a widening preferably takes place here to such an extent that contours of projections, to be specific not orthogonal projections, of three-dimensional inner walls of the central inlet and of the directly neighbouring ceiling inlets onto the build area converge, touch, or overlap one another, whereby a substantially homogeneous ceiling gas stream is shaped at least in a lowest tenth, preferably at least in a lowest fifth, particularly preferably at least in a lowest third of a process chamber height.

In this further development, particularly preferably, a plurality of such central inlets are arranged around the coupling window or the coupling windows in order to achieve a homogenisation of the ceiling gas stream. In the course of this, the inlet nozzles may also be designed such that partial ceiling gas streams being asymmetrical in the cross-section are generated.

In an advantageous embodiment of the method according to the second aspect of the invention, at least temporarily prior to and/or during and/or after the manufacturing of the object, the process gas is supplied to the process chamber in a preferably closed process gas circuit and is discharged from the process chamber through an outlet. In the course of this, the ceiling gas stream represents at least a part of the process gas circuit. Further, in the course of this, supply and/or discharge pipes of the process gas circuit comprise a conveying unit by means of which a velocity and/or velocity distribution and/or pressure distribution of a total process gas stream or of the ceiling gas stream in the process chamber is varied prior to and/or during and/or after the manufacturing of the object.

In the course of this, the supply/discharge may take place steadily, continuously, dynamically, in regular and/or irregular intervals etc. The conveying unit may, for instance, comprise a switchable pump, turbine, or pump turbine, and/or also a propeller. By the above-mentioned variation of the ceiling gas stream, in particular also in relation to the total process gas stream, the process gas distribution in the process chamber and/or the removal of impurities therefrom can be controlled and be adapted that way, for instance, to specific properties of the process chamber and the object to be manufactured in a concrete application case and/or to specific process phases. That way, the process gas throughput of the total process gas stream or of the ceiling gas stream in the process chamber may be, in particular, increased in process phases having an increased impurity generation.

In an advantageous further development of this embodiment, the process gas circuit comprises in addition to the ceiling gas stream at least one of the following gas streams for removing of impurities generated during the solidification of the building material from the process chamber:

a central gas stream supplied to the process chamber at least temporarily prior to and/or during and/or after the manufacturing of the object by means of a central inlet formed in the process chamber ceiling and discharged from the process chamber via at least one outlet, the central gas stream impinging within a central region of the build area substantially at a right angle to the build area, particularly at an angle of at least 45°, preferably at an angle of at least 60°, particularly preferably at an angle of at least 70° (cf. FIG. 13), a lateral gas stream supplied to the process chamber at least temporarily prior to and/or during and/or after the manufacturing of the object via a side inlet arranged at a build area side and discharged from the process chamber via at least one outlet arranged at an opposite side of the build area, preferably such that the lateral gas stream flows in a substantially laminar manner substantially across a preferably total area of the build area (cf. FIG. 14).

In the course of this, an impingement area of the central gas stream within the build area may have an arbitrary shape. The shape of the impingement area may, for example, be circular. In the case of a central gas stream representing the gas stream according to the first aspect of the invention described further above, its substantially elongate oval impingement area may be regular up to elliptical or, alternatively, irregular. The shape of the impingement area may also be variable during operation, e.g. when a recoater moves across the build area in order to apply a building material layer and, in the course of this, deflects the central gas stream or, respectively, makes it instable for a certain period of time. It may be shaped or, respectively, selected in an interdependency with a design, arrangement, and/or control of one or several outlets.

As described further above with regard to the first aspect of the invention, the central region within the build area may also here occupy, for instance, no more than approximately 60%, preferably no more than approximately 20%, particularly preferably no more than approximately 10% of a total area of the build area.

In a further advantageous development of the above embodiment, a preferably adjustable volume ratio of the ceiling gas stream to the central gas stream and/or to the lateral gas stream in the process gas circuit is at least 1:1, preferably at least 2:1, particularly preferably at least 3:1, and/or not exceeding 7:1, preferably not exceeding 6:1, particularly preferably not exceeding 5:1. By such a volume ratio, for instance, a concrete build area size and/or process chamber height from the build area up to the process chamber ceiling in an application case can be taken into account.

In a further advantageous development of the above embodiment, a ratio of a total inlet opening area to a total outlet opening area of the process gas circuit is varied prior to and/or during and/or after the manufacturing of the object. Thereby, a velocity and/or a pressure of the process gas is/are varied at least in a partial region of the process chamber. That way, alternatively or additionally to an above-mentioned adjustable conveying unit, the velocity of the process gas recirculation in the process gas circuit may be advantageously varied or adapted.

In the method according to the second aspect of the invention, the selective solidification is preferably performed by means of a solidification device comprising at least two solidification units. In the course of this, a working area within the build area is assigned to each solidification unit. The working areas are preferably symmetrically arranged with respect to a central plane or central axis going through a central point of the build area perpendicularly to the build area. In particular, the description set forth further above with regard to several solidification units with regard to the first aspect of the invention applies here correspondingly.

A further aspect of the invention is a control unit for an apparatus for generatively manufacturing a three-dimensional object, the control unit being designed/arranged for generating control commands for the preferably automatic execution of a method according to the first and/or second aspect of the invention.

A still further aspect of the invention is an apparatus for generatively manufacturing a three-dimensional object, the apparatus being designed and/or controlled to preferably automatically execute a method according to the first and/or second aspect of the invention. Therein, the control may, for instance, be carried out by means of the control unit according to the invention. The manufacturing apparatus according to the invention comprises a process chamber for manufacturing the object by a layer-by-layer application and selective solidification of a building material within a build area arranged in the process chamber.

Further, with the first aspect of the invention, the apparatus comprises a gas supply device for supplying a process gas to the process chamber during the manufacturing of the object as well as an outlet for discharging the process gas from the process chamber. In the course of this, according to the invention, the gas supply device is designed and/or arranged relatively to the build area and/or controlled such that a gas stream of the process gas streaming through the process chamber is shaped in such a manner that at least one substantially elongate oval impingement area of the gas stream is generated within the build area.

With the second aspect, the process chamber of the apparatus according to the invention has a chamber wall having a process chamber ceiling lying above the build area. According to the invention, multiple ceiling inlets are formed in the process chamber ceiling for supplying a ceiling gas stream to the process chamber which are distributed over a region of the process chamber ceiling and which are designed and/or arranged and/or controlled such that the ceiling gas stream exiting the ceiling inlets is directed substantially vertically downwards onto the build area.

As for the rest, the description set forth further above with regard to the method according to the invention correspondingly applies to the manufacturing apparatus according to the first and/or second aspect of the invention.

In the following, the above-mentioned and further features and effects of the invention are described in more detail with the help of exemplary embodiments with reference to the drawings. The demonstration of the manufacturing apparatus, the central gas stream according to the invention, which will also be in short simply denoted by "gas stream" in the first aspect, its impingement area within a build area, and the ceiling gas stream according to the invention (second aspect of the invention) is merely schematic in the drawings and is therefore not to be understood as true to scale. Same or corresponding elements are denoted in different examples by same or corresponding reference signs.

BRIEF DESCRIPTION OF THE DRAWINGS

FIG. 10b is a schematic top view of working areas of the four solidification units within the build area of the process chamber of FIG. 10a;

FIG. 12b is a schematic top view of the build area and of the ceiling inlets in the manufacturing apparatus of FIG. 12a;

DETAILED DESCRIPTION OF THE EMBODIMENTS

Figure 1:
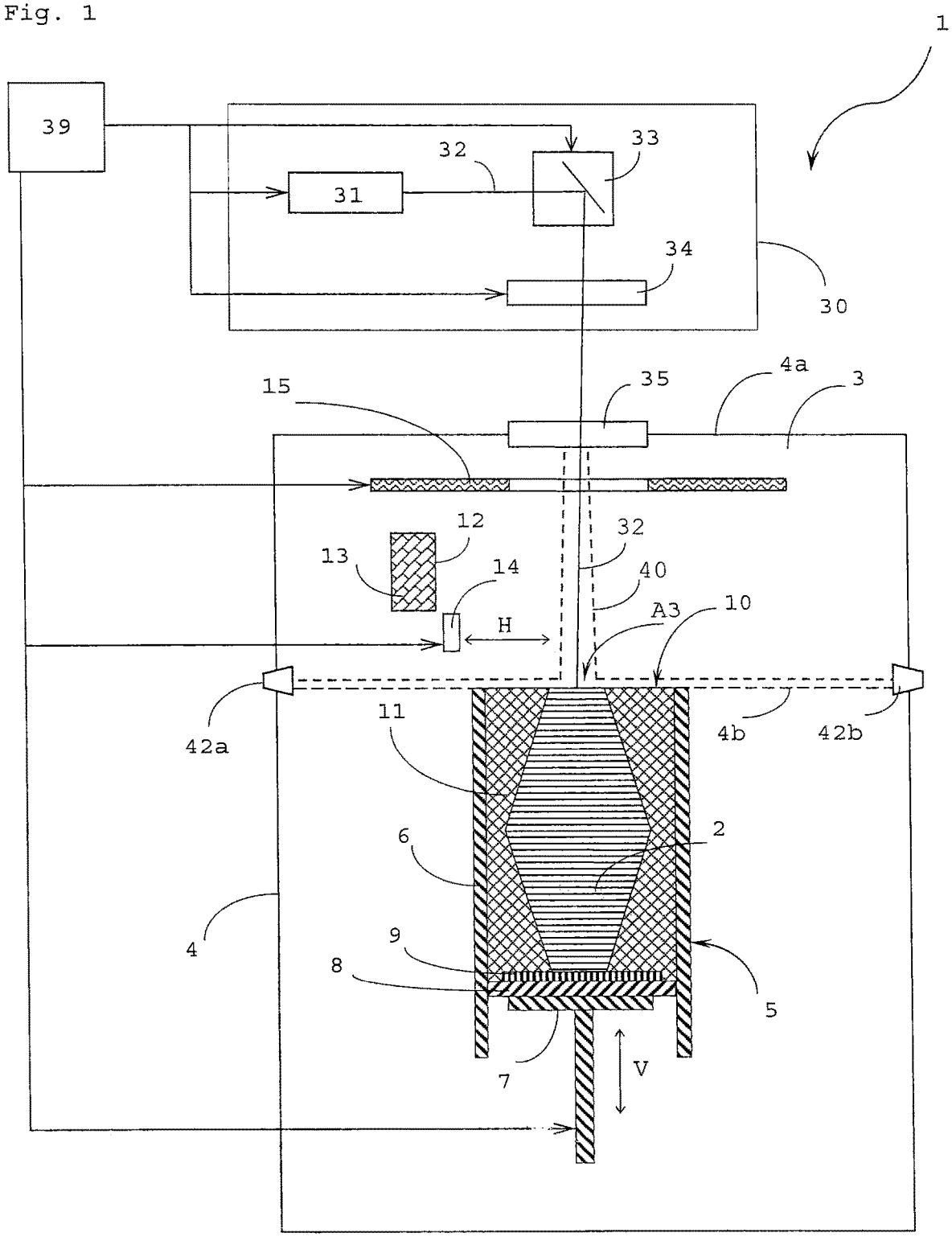
FIG. 1 is a schematic cross-sectional side view of an embodiment of the manufacturing apparatus according to the invention having at least one solidification unit.

Referring to FIG. 1, an embodiment of an apparatus 1 for generatively manufacturing a three-dimensional object is described, the apparatus being designed and/or controlled to preferably automatically execute a manufacturing method according to the invention. The layer manufacturing apparatus 1 schematically shown in FIG. 1 is a laser sintering of laser melting apparatus. For manufacturing a three-dimensional object 2 by a layer-by-layer application and selective solidification of a building material, it contains a process chamber 3 having a chamber wall 4 comprising a process chamber ceiling 4a.

In the process chamber 3, an open-top container 5 having a container wall 6 is arranged. In the container 5, a support 7 movable in a vertical direction V is arranged at which a base plate 8 is mounted which closes the container 5 below and thereby forms its bottom. The base plate 8 may be a plate formed separately from the support 7, which is attached to the support 7, or it may be integrally formed with the support 7. Depending on a building material used (in particular, powder) and a process, a platform 9 may further be mounted on the base plate 8 as building support, on which the object 2 is built up. However, the object 2 may also be built up on the base plate 8 itself, which then serves as a building support. In FIG. 1, the object 2 to be built in the container 5 on the platform 9 is shown below a build area 10 defined by the upper edge of the container wall 6 in an intermediate state with several layers being already solidified, surrounded by building material 11 remaining non-solidified.

The laser sintering apparatus 1 further contains a storage container 12 for a building material 13 which can be solidified by an electromagnetic radiation and is, in this example, in powder form and a recoater 14 movable in a horizontal direction H for applying the building material 13 layer-by-layer onto the building support or onto a previously applied layer within the build area 10. Optionally, a radiation heater 15 is arranged in the process chamber 3 for heating the applied building material 13. As radiation heater 15, e.g. an infrared radiator may serve.

In order to selectively solidify the applied building material 13, the laser sintering apparatus 1 contains a solidification device 30 (also referred to as irradiation device in the following) having a laser 31 generating a laser beam 32. The laser beam 32 is deflected via a deflecting device 33 and is focused by a focusing device 34 via a coupling window 35, which is mounted in the process chamber ceiling 4a, onto the building support or a previously applied layer of the building material 13. The solidification device 30 may basically also comprise further solidification units, which are not seen in the cross-sectional side view of FIG. 1, having further lasers and/or deflecting and focusing devices and/or coupling windows.

The laser sintering apparatus 1 further contains a control unit 39 via which the individual components of the apparatus are controlled (indicated by arrows in FIG. 1) in a coordinated manner for executing the building process, in particular, a method according to the invention. Alternatively or additionally, a control unit may also be partially or completely be arranged outside the apparatus 1. The control unit may contain a CPU whose operation is controlled by a computer program (software). The computer program may be stored separately from the apparatus on a storage medium, from which it can be loaded into the apparatus, in particular, into the control unit 39. The control unit is preferably a control unit according to the invention.

During operation, the building support, which is a surface of the platform 9 in this example, is located at the beginning of the manufacturing process at the height of the build area 10 and is respectively lowered for applying a building material layer by a height corresponding to the desired layer thickness.

By moving the recoater 14 within the build area 10, a layer of the building material 13 in powder form (pulverulent) is respectively applied to the building support or a pre-existing upper powder layer. The application takes place at least over the total respective cross-section of the object 2 to be manufactured. Optionally, the pulverulent building material 13 is heated up by means of the radiation heater 15 to an operating temperature. Subsequently, the cross-section of the object 2 to be manufactured is scanned by the laser beam 32, so that the pulverulent building material 13 is solidified at the points corresponding to the cross-section of the object 2. These steps are repeated as long as until the object 2 is completed.

According to the invention, a gas stream 40 of a process gas is supplied to the process chamber 3 through a gas supply device (not shown) arranged in the process chamber ceiling 4a while the object 2 is being manufactured in order to remove impurities generated in the course of the selective solidification from the process chamber 3. A process-chamber-sided inlet of the gas supply device (not shown in FIG. 1) may have an arbitrary suitable arrangement in the process chamber ceiling 4a and form. The gas stream 40 exits the process chamber 3 through outlets 42a and 42b arranged at opposed build area sides approximately at the height of the build area. The outlets 42a and 42b are merely schematically indicated in FIG. 1. They may have any suitable arrangement and geometry, in particular according to the further-above-described advantageous configurations of the invention. In particular, the outlets 42a and 42b may be arranged in or at the chamber wall 4, directly at the build area edge or at a distance therefrom, as well as not necessarily at the height of the build area.

After exiting the gas supply device, the gas stream 40 streams through the process chamber 3 in a non-guided manner and substantially vertically, this means except for a possible billowing of the gas stream 40 and a minor deviation of margin regions of the gas stream 40 by up to approximately 20° from a vertical with respect to the build area 10, towards the build area 10. There, the gas stream 40 impinges in an impingement area A3 according to the invention, which lies centrally within the build area 10, onto the upper building material layer and is laterally deflected partly by the upper building material layer, partly, as the case may be, by a suction effect of the outlets 42a and 42b. Subsequently, the gas stream flows off, preferably substantially parallel to the build area 10, towards the outlets 42a and 42b and thereby removes impurities from the process chamber 3.

Figure 2:
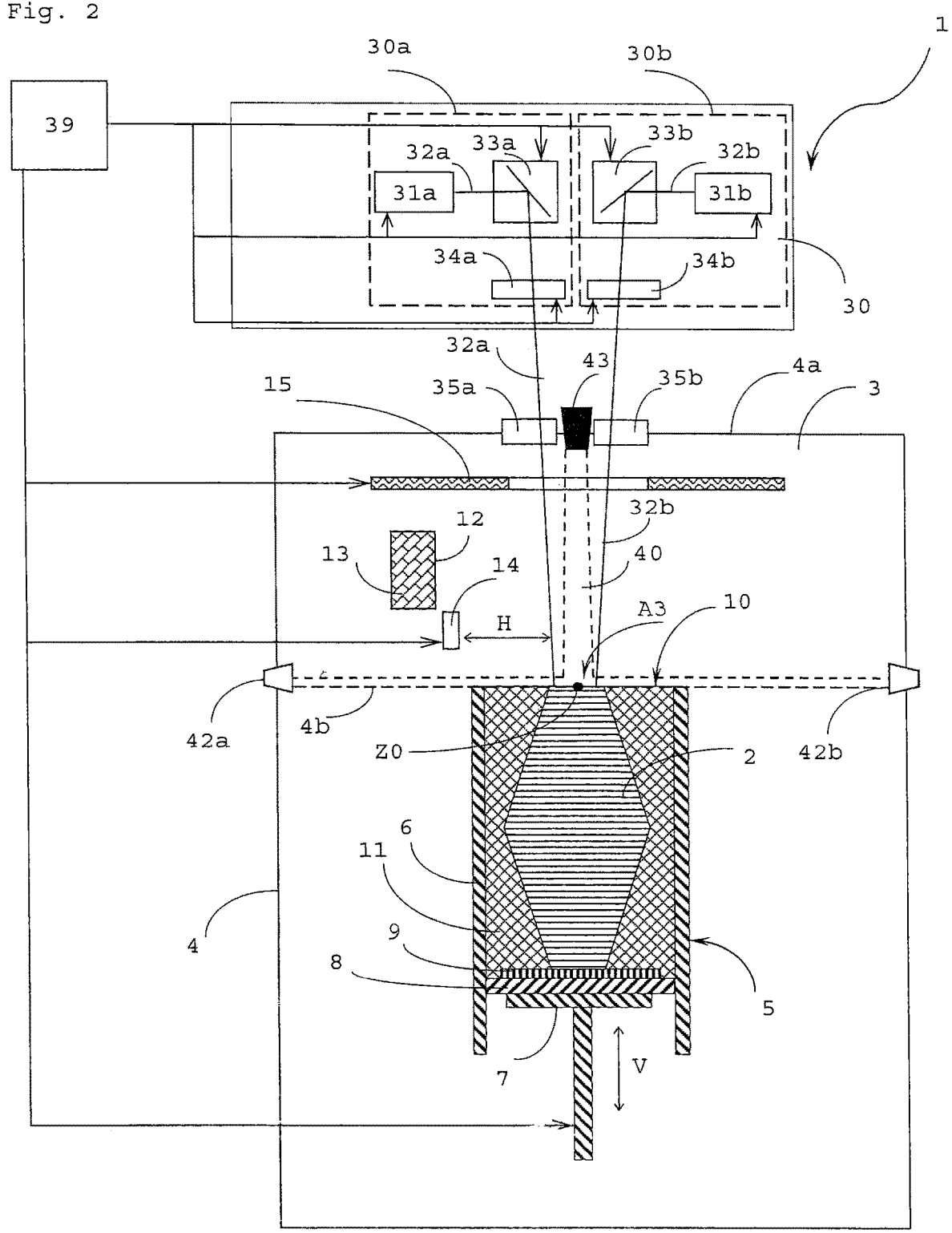
FIG. 2 is a schematic cross-sectional side view of a further embodiment of the manufacturing apparatus according to the invention having at least two solidification units.
Figure 3:
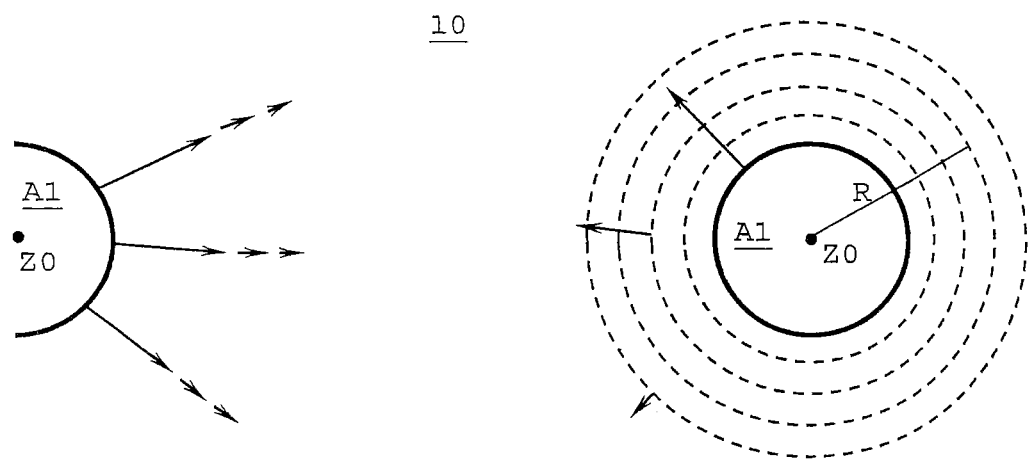
FIG. 3 is a schematic view of a gas stream having a conventional circular impingement area within the build area flowing off towards the build area edge (in top view)
Figure 4:
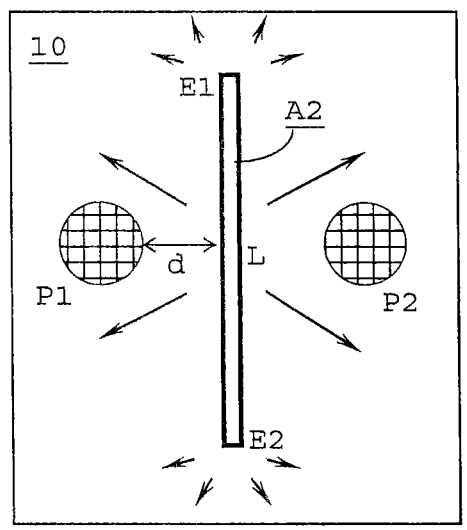
FIG. 4 is a schematic view of a gas stream having a conventional elongate rectangular impingement area within the build area flowing off towards the build area edge (in top view)
Figure 5:
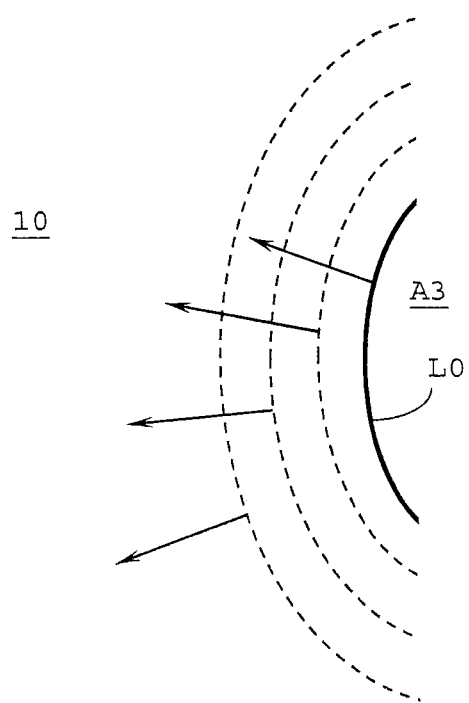
FIG. 5 is a schematic view of a gas stream flowing off towards the build area edge in the vicinity of a "long side" of an elongate oval impingement area according to the invention within the build area (in top view)
Figure 6:
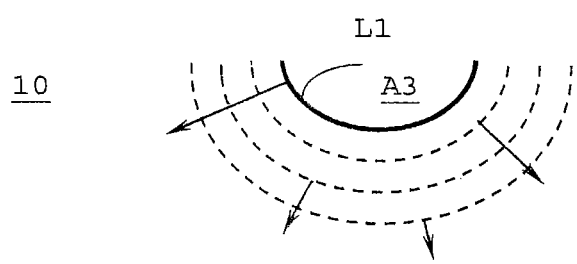
FIG. 6 is a schematic view of a gas stream flowing off towards the build area edge in the vicinity of a "narrow side" of an elongate oval impingement area according to the invention within the build area (in top view)

FIG. 2 shows a further embodiment of the manufacturing apparatus 1 according to the invention. In differs from the apparatus of FIG. 1 in the configuration of the solidification device 30 and in a specific configuration of a process-chamber-sided inlet of the gas supply device.

The manufacturing apparatus 1 in FIG. 2 is a so-called multi-scanner-machine since the solidification device 30 comprises several solidification units. In the cross-sectional side view of FIG. 2, two of them can be seen. Components of the one solidification unit 30a on the left in the figure are denoted by an additional index "a", those of the other one solidification unit 30b on the right in the figure by an additional index "b".

By way of example only, each solidification unit comprises a laser 31a/31b generating a laser beam 32a/32b, as well as a deflecting device 33a/33b, a focusing device 34a/34b, and a coupling window 35a/35b. Alternatively, a solidification unit may also comprise only one or a part of the above-mentioned elements.

To each solidification unit, a working area (in FIG. 2 on the left and on the right) within the build area 10 is assigned which can be scanned by the respective laser beam 32a or 32b. In this example, the working areas are arranged axially symmetrically with respect to a central plane which goes through a central point Z0 of the build area and is perpendicular to the build area 10 and to the drawing plane.

The apparatus 1 may have further pairs of solidification units which are not to see in the cross-sectional side view of the FIG. 2 and which are preferably arranged and/or designed similarly to FIG. 2. An example of a four-scanner-machine having four solidification units on the whole is described further below referring to FIGS. 10a and 10b. Furthermore, referring to FIGS. 11a and 11b, an example of a six-scanner-machine having six solidification units on the whole is described.

Further, the gas supply device (not shown) ends in FIG. 2 in a process-chamber-sided inlet 43, which may, for instance, be a nozzle. The nozzle 43 protrudes from the process chamber ceiling 4a not substantially, here, by way of example only, by approximately 4 cm downwards into the process chamber 3 with a process chamber height measured vertically from the build area 10 up to a coupling window 35a/35b being approximately 49 cm. Alternatively, the inlet 43 may also protrude deeper or, alternatively, not protrude at all into the process chamber 3.

In FIG. 2, the nozzle 43 is arranged approximately centrally between the coupling windows 35a and 35b of the two solidification units 30a and 30b shown. Since the gas stream 40 streams substantially vertically downwards towards the build area 10, the impingement area A3 of the gas stream 40 also lies centrally in the build area and, thus, in both working areas which can be scanned by the two laser beams 32a or 32b within the build area 10. That way, each working area is flown over/through by its own gas stream portion flowing in FIG. 2 either to the left or to the right from the centre Z0 of the build area. Therefore, impurities generated in the respective working areas are removed by the respective gas stream portions on the shortest route towards the build area edge. Consequently, the two lasers 31a and 31b do not mutually disturb one another with regard to the impurities which they cause in the manufacturing process by irradiating the powder.

Subsequently, the advantageous effects of an elongate oval impingement area according to the first aspect of the invention as compared to the conventional circular or elongate rectangular impingement areas, which advantageous effects have been set forth above with reference to FIGS. 3 to 6, will be further described and supplemented referring to FIGS. 7 to 11.

Figure 7:
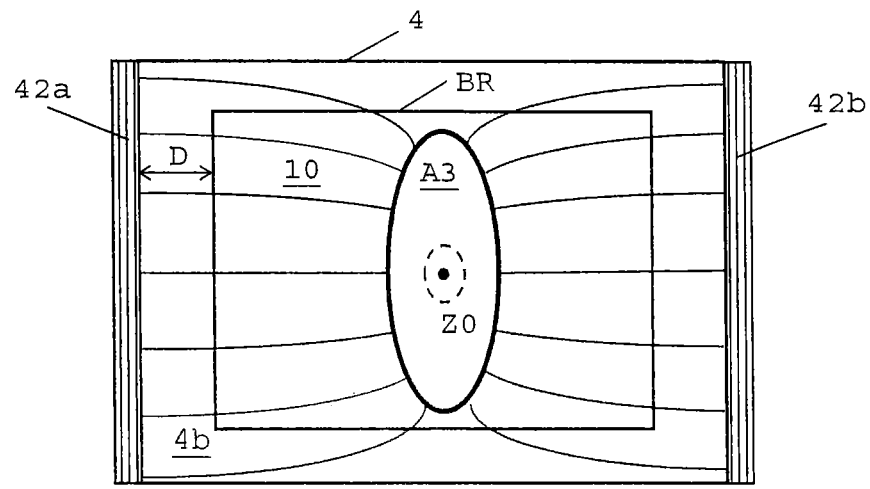
FIG. 7 is a schematic top view of an example of the arrangement of a build area in the process chamber of a manufacturing apparatus according to the invention with flow lines of the gas stream above the build area.

FIG. 7 shows in a schematic top view an example of the arrangement of the build area in the process chamber of a manufacturing apparatus according to the invention with flow lines of the gas stream above the build area. In particular, it may be the apparatus 1 of FIG. 1 or 2.

In this example, the build area 10 has a rectangular build area edge BR, which may preferably be quadratic and may, for instance, be 400 mm×400 mm. Here, also the chamber wall 4 of the process chamber 3 is rectangular in a horizontal cross-section at a height of the build area. By way of example only, symmetry axes of both rectangles coincide. Around the build area 10, a process chamber bottom 4b is shown, lying, for example, approximately at the height of the build area.

Symmetrically arranged with respect to a centre Z0 of the build area 10, there is the elongate oval impingement area A3 of the gas stream according to the invention. In this example it is elliptical, having a long axis of the ellipse parallel to a narrow side of the build area. A dashed line shows an orthogonal projection of the process-chamber-sided opening of an inlet of the gas supply device (for example, the nozzle 43 in FIG. 1 or 2). In particular by an expanding effect of the inlet, i.e. an effect of widening a cross-section of the gas stream towards the build area, the impingement area A3 is larger than the projection of the opening of the inlet onto the build area 10.

After impinging within the impingement area and the deflection, the gas stream flows along the build area 10 and the process chamber bottom 4b towards the outlets 42a and 42b, which, by way of example only, extend over the whole respective narrow side of the chamber wall 4 parallel to the narrow sides of the build area. In particular, the outlets 42a and 42b extend here on their both ends beyond the respective build area side.

Due to a distance D, which may, for instance, be 10 to 20 cm or larger, between an outlet 42a/42b and the nearest narrow side of the build area 10, a suction effect exerted, as the case may be, by the outlet on the gas stream volume is relatively small above the build area 10. Therefore, the deflection of the gas stream after the impingement mainly takes place due to the rebound of the gas stream at the upper building material layer within the impingement area A3 and due to a subsequent flowing off of the gas stream portions into respective nearby regions which are not charged by the gas stream afterflow, the latter being continuous at least during the solidification. The flow lines of the gas stream portions flowing off towards the outlets 42a, 42b after the deflection are indicated by continuous curved lines.

Additional outlets may be provided at the long sides of the chamber wall 4, in particular centrally, in order to support the discharging of the gas stream portions flowing off at the "narrow sides" of the ellipse A3 from the process chamber.

Figure 8:
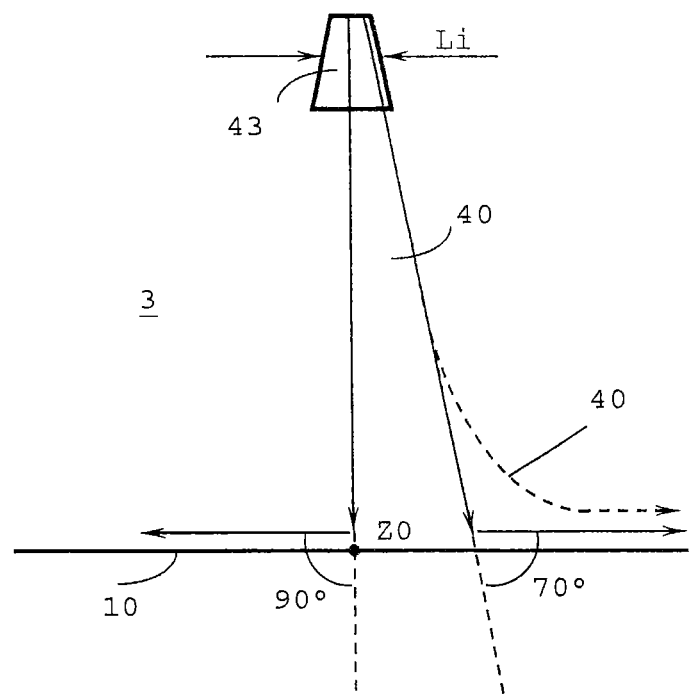
FIG. 8 is a schematic cross-sectional side view of an arrangement of an inlet relatively to a build area with flow lines of the gas stream according to the invention in the process chamber.

FIG. 8 is a schematic cross-sectional side view of an example of flow lines of a gas stream according to the invention in the process chamber, which may be part of the manufacturing apparatus 1 of FIG. 1 or 2. The gas stream 40 streams into the process chamber 3 through the inlet 43, which may e.g. be designed as a nozzle. With regard to the construction of the nozzle 43, for instance, the descriptions referring to FIG. 7 or 9a may apply here.

The nozzle 43 has an inner cross-section length Li (which lies in the drawing plane of FIG. 8) growing in a vertical direction towards the build area 10. Due to this, the gas stream 40 passing through the nozzle 43 gets wider in the direction of this inner cross-section length or, respectively, it gets expanded.

In the course of this, however, an inner cross-section area of the nozzle 43 preferably remains substantially constant over the extension of the nozzle 43 in the direction towards the build area 10, so that the velocity of the gas stream 40 also remains substantially unchanged as it passes through the nozzle 43.

Due to the expanding effect of the nozzle 43, in the drawing plane of FIG. 8, an outer gas flow line of the gas stream 40—it is indicated by a continuous line—deviates e.g. by approximately 20° from a vertical)(90° with respect to the build area 10. The vertical approximately corresponds to the direction of a central gas stream flow line streaming towards the centre Z0 of the build area 10, which is also indicated by a continuous line. Depending on a gas stream density and/or suction effect of the outlet, the course of the gas flow lines in margin regions of the gas stream 40 may get flatter (indicated by a dashed line in FIG. 8).

With a constant inner cross-section area of the nozzle 43 over its extension, the gas stream 40 is simultaneously concentrated in the nozzle 43 in a direction perpendicular to the drawing plane (in FIG. 8 not visible). This will be subsequently visualized in further examples with the aid of FIGS. 9a-9d.

Referring to FIGS. 9a-9d, in the following, several examples of an inlet of the gas supply device in form of a nozzle having an expanding effect on the gas stream according to the invention are described. In the course of this, the gas supply line (not shown) ending in the nozzle has, by way of example only, always a circular inner cross-section. Further, also here the nozzle preferably has, similarly to FIG. 8, a substantially constant inner cross-section area for the gas stream flowing through the nozzle. The nozzles shown in FIGS. 9a-9d may, in particular, be employed in the manufacturing apparatus 1 described with reference to FIGS. 1-8.

Figure 9A:
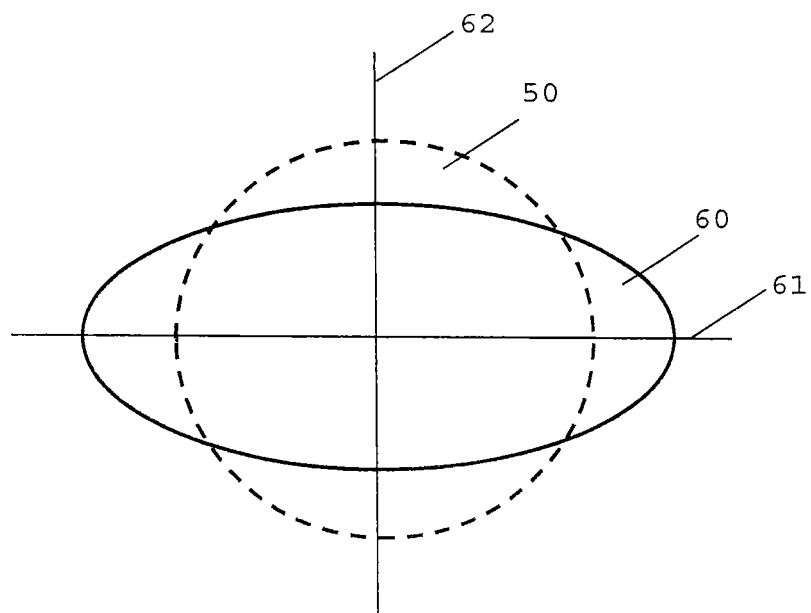
FIGS. 9a and 9b are schematic top views of examples of an inlet of a gas supply device according to the invention having an expanding effect.

FIG. 9a schematically shows in a top view a first embodiment of such a nozzle, which may, for example, be the nozzle 43 of FIG. 2 or 8. A circular pipe-sided inner cross-section 50 of the nozzle is shown by a dashed line. In this embodiment, a process-chamber-sided inner cross-section 60 (here, at the same time an opening area) of the nozzle has the shape of an ellipse which is concentric with the gas supply pipe. The opening area 60 does not necessarily need to be elliptical, it rather may be an arbitrary elongate oval having two perpendicular symmetry axes 61 and 62 as shown.

Figure 9B:
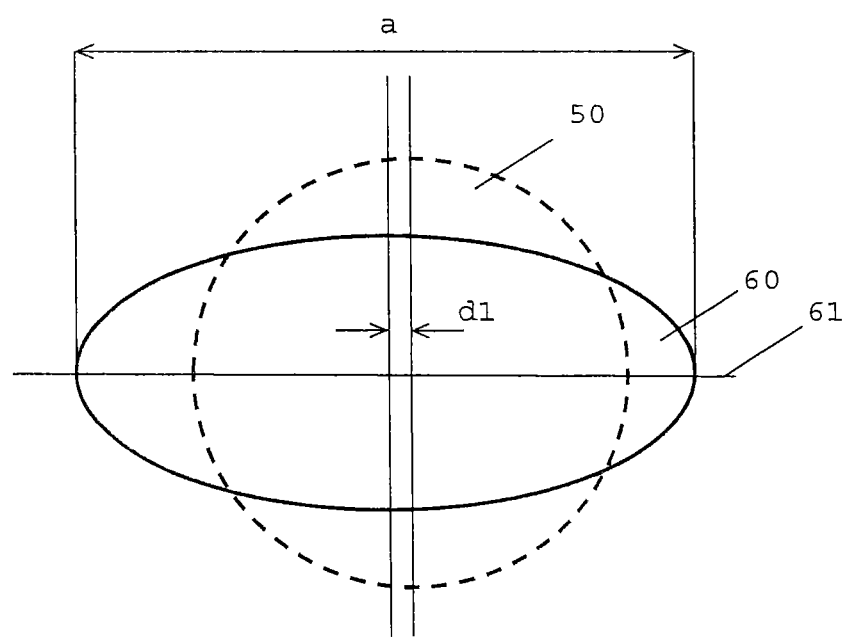

FIG. 9*b* shows a schematic top view of a second embodiment of the nozzle which differs from the one of FIG. 9*a* only in that the short axis of the ellipse is parallel shifted to the left by a distance dl from a vertically drawn symmetry axis of the circular inner cross-section 50. The long axis a of the ellipse still coincides in the top view of FIG. 9*b* with a horizontally drawn symmetry axis of the circular inner cross-section 50.

Such an offset dl may be used for a preferably minor deflection of the gas stream as it passes through the nozzle, in order to effect a corresponding shifting of its impingement area within the build area. The offset dl may, for instance, be approximately 3 mm with a long axis a of the ellipse being approximately 75 mm. In the course of this, deviations from a concentric arrangement of the two inner cross-sections 50 and 60 are preferably small, in order to avoid undesired turbulences of the gas stream streaming out of the nozzle at any rate.

Figure 9C:
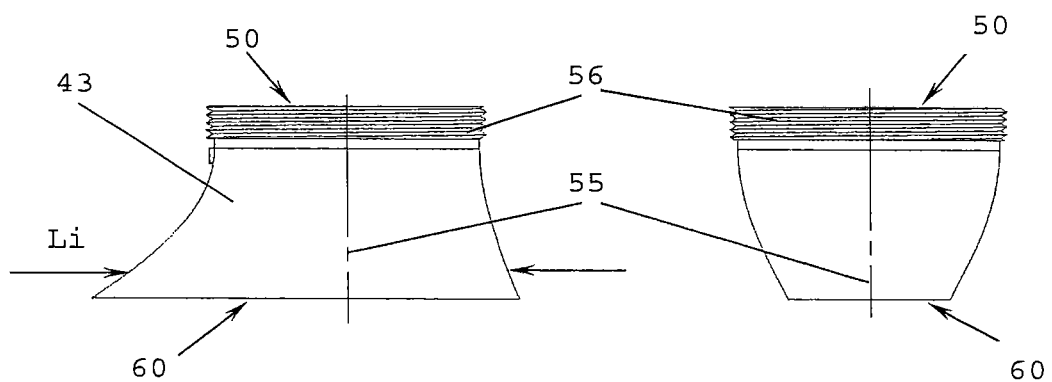
FIG. 9c shows two side views rotated by 90° with respect to each other of a further example of an inlet of the gas supply device according to the invention having an expanding effect.
Figure 9D:
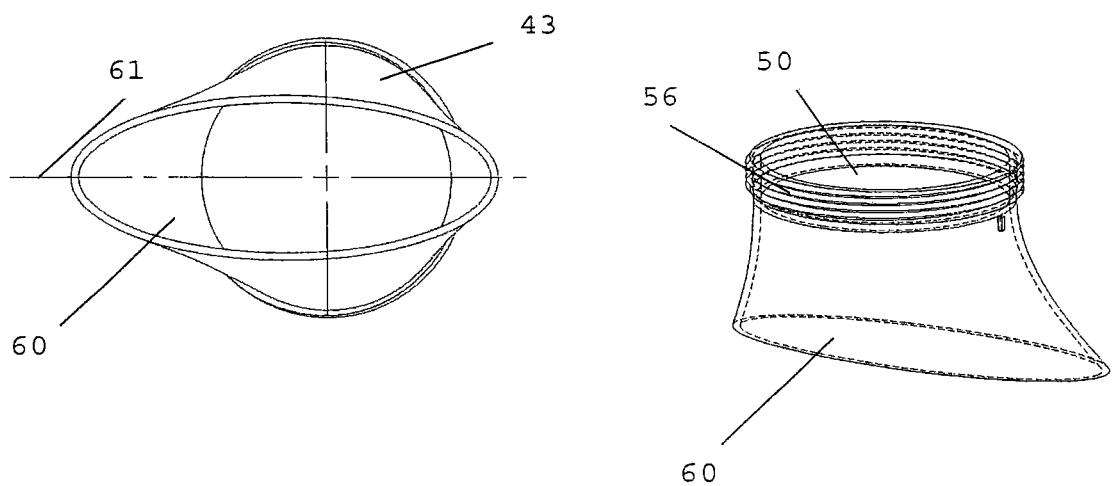
FIG. 9d schematically shows a process-chamber-sided top view on the left and a perspective view on the right of the inlet of FIG. 9c.

FIGS. 9*c* and 9*d* show a third embodiment of an inlet of the gas supply device in form of a nozzle 43 having a partially expanding effect on the gas stream according to the invention. This nozzle differs from the one of FIG. 9*b* in that its process-chamber-sided opening area 60 extends in a direction of its longitudinal axis 61 considerably farther to one side than to the opposite side with respect to a central axis 55 of the circular gas supply pipe. In this manner, the shaping of the gas stream according to the invention may be adapted to specific, for instance, asymmetric spatial conditions in the process chamber. In the course of this, in particular, the process-chamber-sided opening area 60 of the nozzle may also be designed arbitrarily strongly asymmetric along its longitudinal axis 61, whereas FIGS. 9*c*-9*d* show by way of example only an elliptical opening area 60. As for the rest, the above description with regard to FIGS. 9*a* and 9*b* may correspondingly apply here.

FIG. 9*c* schematically shows two side views of the nozzle 43 rotated relatively to one another by 90° around the central axis 55 of the supply pipe. The left side view is, as in FIG. 8, aligned with respect to an inner cross-section length Li of the nozzle 43 which grows in a direction vertically towards the build area 10 (not shown). As in FIG. 8, the gas stream 40 according to the invention (not shown) is expanded in a direction of the growing inner cross-section length Li as it passes through the nozzle 43. The right side view shows a taper of the nozzle 43 in a direction perpendicular hereto with a constant inner cross-section area, whereby the gas stream 40 is concentrated. Altogether, this results in a process-chamber-sided elongate oval opening area 60 of the nozzle 43, which leads to an elongate oval impingement area of the gas stream 40 within the build area 10 according to the invention (as, for instance, illustrated in FIG. 7).

Further, FIG. 9*d* shows on the left a schematic process-chamber-sided top view (i.e. a view from below) of the nozzle of FIG. 9*c* and on the right its schematic perspective view. For being detachably fastened at the process chamber ceiling 4*a*, the nozzle 43 in FIGS. 9*c* and 9*d* has at its end with the circular inner cross-section 50 an external thread 56 representing the fastening device according to the invention. In this example, the process chamber ceiling 4*a* (not shown) has a complementary inner thread.

In a not shown fourth embodiment of an inlet of the gas supply device in form of a nozzle having an expanding effect on the gas stream according to the invention, the process-chamber-sided opening area is not elliptical but rather only axially symmetrical with respect to its longitudinal extension, being, however, irregularly oval-shaped apart from that. Thus, such a nozzle possesses only one axis of symmetry (its longitudinal axis) and is, beyond that, not concentric with the gas supply pipe ending in the nozzle. As for the rest, the above description with regard to FIGS. 9*a*-9*d* correspondingly applies here.

Figure 10A:
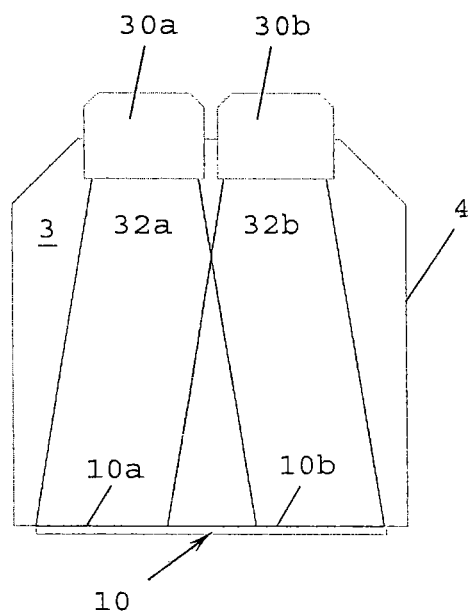
FIG. 10a is a schematic cross-sectional side view of a process chamber of a manufacturing apparatus according to the invention having four solidification units (with a laser beam path)

FIG. 10*a* shows a schematic cross-sectional side view of a process chamber of a manufacturing apparatus according to the invention having four solidification units, only two of which are to see in the cross-sectional side view. In particular, it may be an apparatus 1 of FIG. 2. In this example, each solidification unit 30*a* and 30*b* comprises a laser and a focusing optics, which generate a laser beam 32*a*/32*b* which can scan an assigned working area 10*a*/10*b* of a build area 10.

Figure 10B:
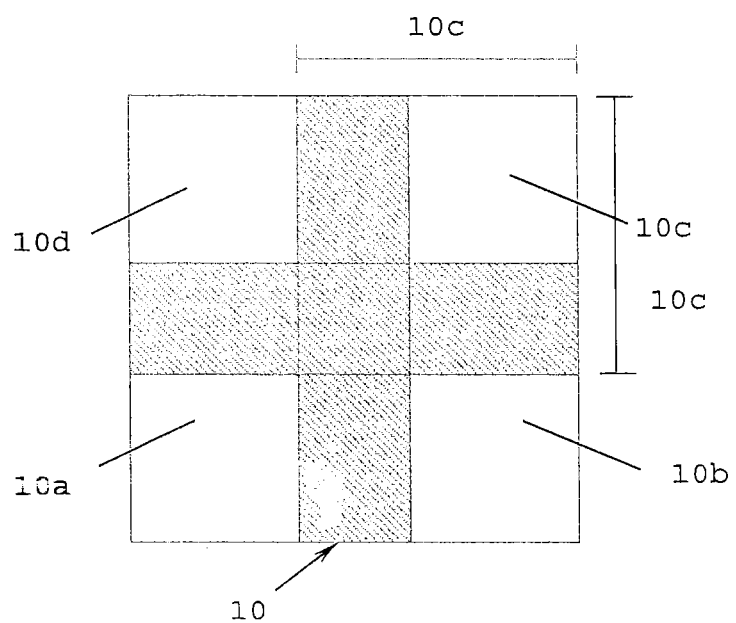

FIG. 10*b* shows a (by way of example only) quadratic build area of FIG. 10*a* in a schematic top view. In this example, four working areas 10*a*, 10*b*, 10*c*, and 10*d* of the four solidification units are identical quadrants completely covering the build area 10. They respectively overlap each other at sides facing each other. The overlapping regions are shown as hatched. For the sake of better illustration, a side of the working area 10*c* is shown. An elongate oval impingement area according to the invention may be arranged here, for instance, as in FIG. 11*b* with respect to working areas 10*a*-10*d*.

Figure 11A:
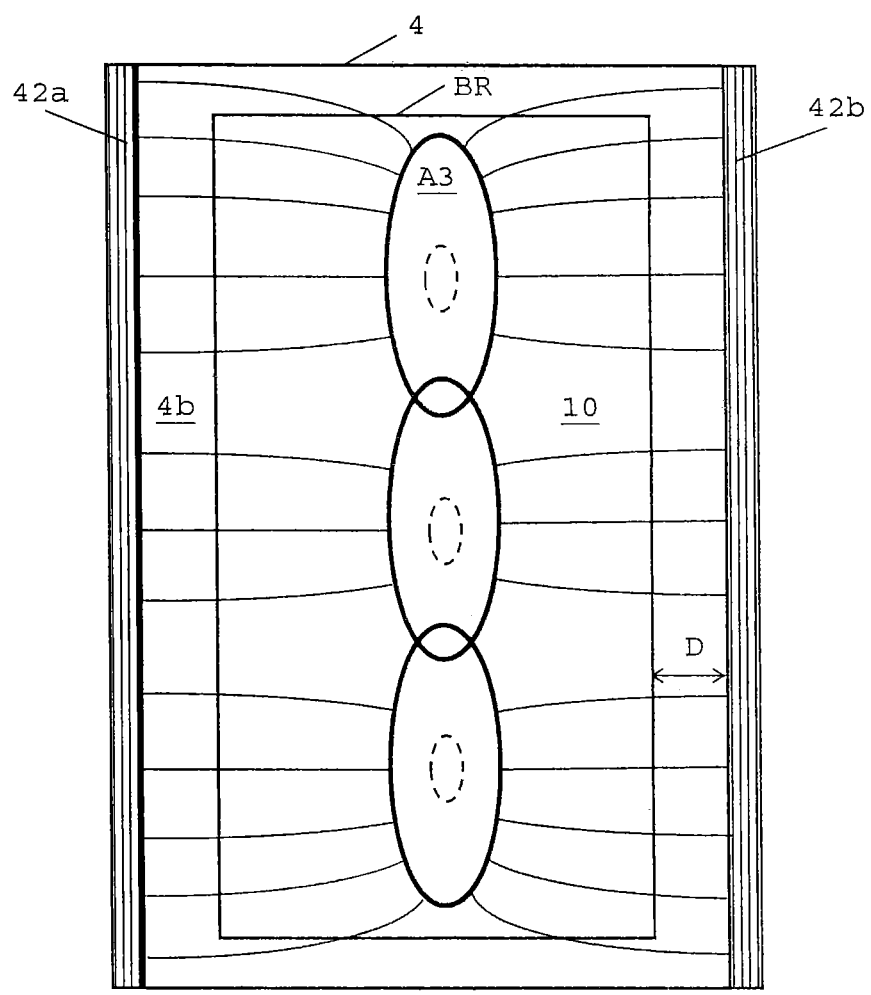
FIG. 11a is a schematic top view of an example of a build area extension in a manufacturing apparatus according to the invention by three impingement areas of the gas stream stringed together.

FIG. 11*a* schematically shows in a top view an example of a build area extension in a manufacturing apparatus according to the invention by stringing together three elongate oval impingement areas of the gas stream according to the invention.

As for the rest, the above description with regard to FIGS. 1-10 may apply in this example.

By way of example only, here, three impingement areas A3 are similarly formed (elliptically, for instance, as in FIG. 7) and similarly oriented. They also share a common axis of symmetry (not shown), which is, respectively, the long axis of the ellipse. Furthermore, this common axis of symmetry also coincides with the long axis of symmetry of the rectangular build area 10. The impingement areas A3 overlap each other at narrow sides of the ellipses facing each other. Altogether, this results in a nearly uniform stream course of the impinging gas stream according to the invention along the build area 10, wherein, after impinging, the gas stream predominantly flows off on a short, nearly straight route from the impingement area to the respective outlet 42*a* or 42*b*. As for the rest, the above description with regard to FIG. 7 correspondingly applies here.

Figure 11B:
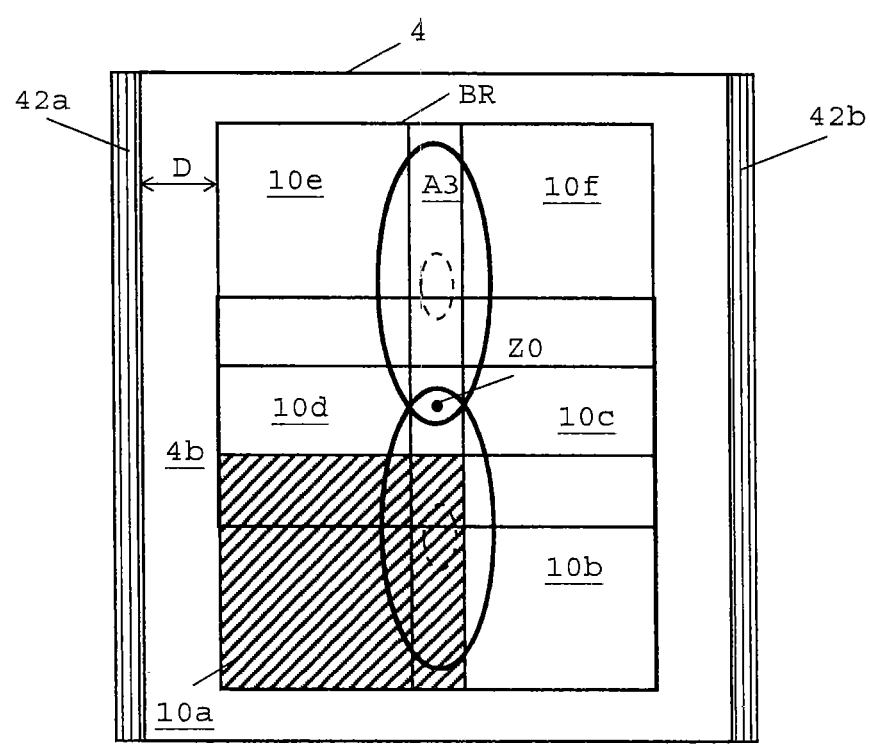
FIG. 11b is a schematic top view of an example of a build area extension in a manufacturing apparatus according to the invention whose solidification device has six solidification units.

FIG. 11*b* schematically shows in a top view a further example of a build area extension in a manufacturing apparatus according to the invention. Here, in contrast to FIG. 11*a*, only two elongate oval impingement areas of the gas stream are stringed together. As for the rest, the above description with regard to FIG. 11*a* correspondingly applies also in this example.

In FIG. 11*b*, the build area 10 is subdivided in six partially overlapping working areas 10*a*-10*f* of six solidification units of the solidification device. As for the rest, the above description with regard to a four-scanner-machine with reference to FIGS. 10*a*/10*b* correspondingly applies here.

Also here, by way of example only, the working areas 10a-10f are equal, they are preferably respectively quadratic in shape. For a better illustration, the working area 10a is highlighted by hatching.

In FIG. 11b, the common axis of symmetry of the two impingement areas A3 passes substantially centrally through the build area 10. This common axis of symmetry passes centrally and symmetrically with respect to the row of the working areas 10a, 10d, and 10e arranged on the left in the figure and the row of the working areas 10b, 10c, and 10f arranged on the right in the figure. As already mentioned further above, such a central symmetrical arrangement of the impingement areas with respect to the working areas 10a-10f has, inter alia, the advantage of short, nearly straight routs for the gas stream flowing off to the outlets 42a/42b after its impingement. Moreover, that way, the individual working areas are streamed over by respective different, their own gas stream portions, so that impurities above one of the working areas do not or scarcely get to the other working areas, so that the increased number of solidification units does not negatively affect the removal of impurities above the build area.

With the build area allocation as in FIG. 11b in a six scanner laser sintering system, in the above-mentioned preferably closed process gas circuit of a central gas stream according to the invention and a ceiling gas stream according to the invention, the volume ratio of the ceiling gas stream to the central gas stream may, for instance, be 5:1. The resulting six volume parts of the process gas can then be, for instance, discharged from the process chamber through respectively three outlets arranged at both long sides of the build area (in particular, respectively one at a working area).

Figure 12A:
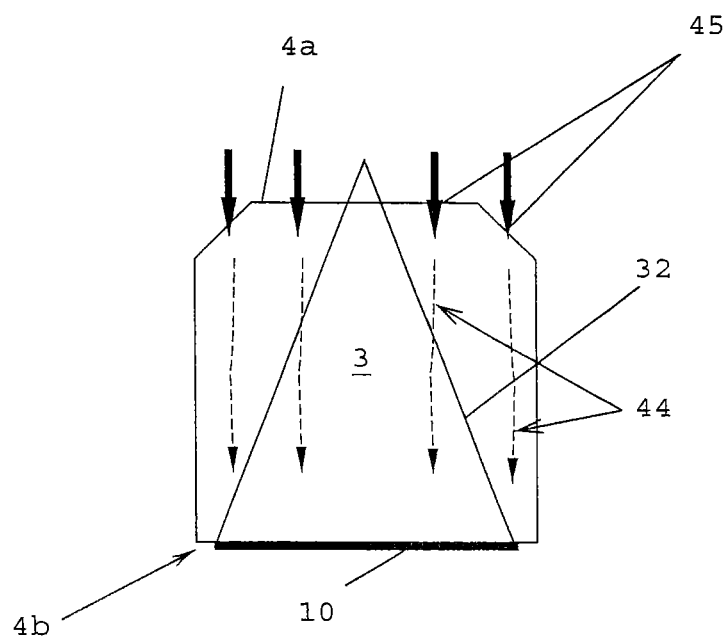
FIG. 12a is a schematic cross-sectional side view of the process chamber of a manufacturing apparatus according to the invention having a ceiling gas stream.

FIG. 12a is a schematic cross-sectional side view of the process chamber of a manufacturing apparatus according to the invention having a ceiling gas stream. The manufacturing apparatus may, in particular, be the laser sintering apparatus 1 described with reference to FIGS. 1-11. Through ceiling inlets 45 (indicated by continuous arrows) arranged in a process chamber ceiling 4a, a ceiling gas stream 44 (indicated by dashed arrows) is supplied to the process chamber 3. This one descends vertically in form of a substantially homogeneous process gas carpet from the process chamber ceiling 4a onto the process chamber bottom 4b lying below it and being formed by the build area 10 and its surrounding, which corresponds to the remaining region of the process chamber bottom 4b here. A beam path of a solidification device, which may comprise one or more, e.g. four, solidification units having respectively one laser, is schematically indicated by two sides of a triangle 32 passing the process chamber 3.

Figure 12B:
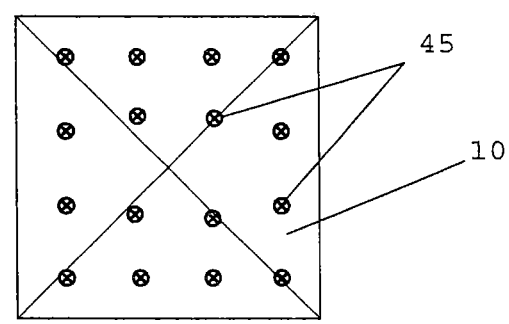

FIG. 12b is a schematic top view on the build area 10 and on the ceiling inlets 45 in the manufacturing apparatus of FIG. 12a. In this example, the ceiling inlets 45 are substantially uniformly distributed over a total region of the process chamber ceiling 4a, with the exception of a region occupied by a coupling optics (for instance, coupling window, not shown) for the solidification radiation, for generating a substantially homogeneous ceiling gas stream 44.

Figure 13:
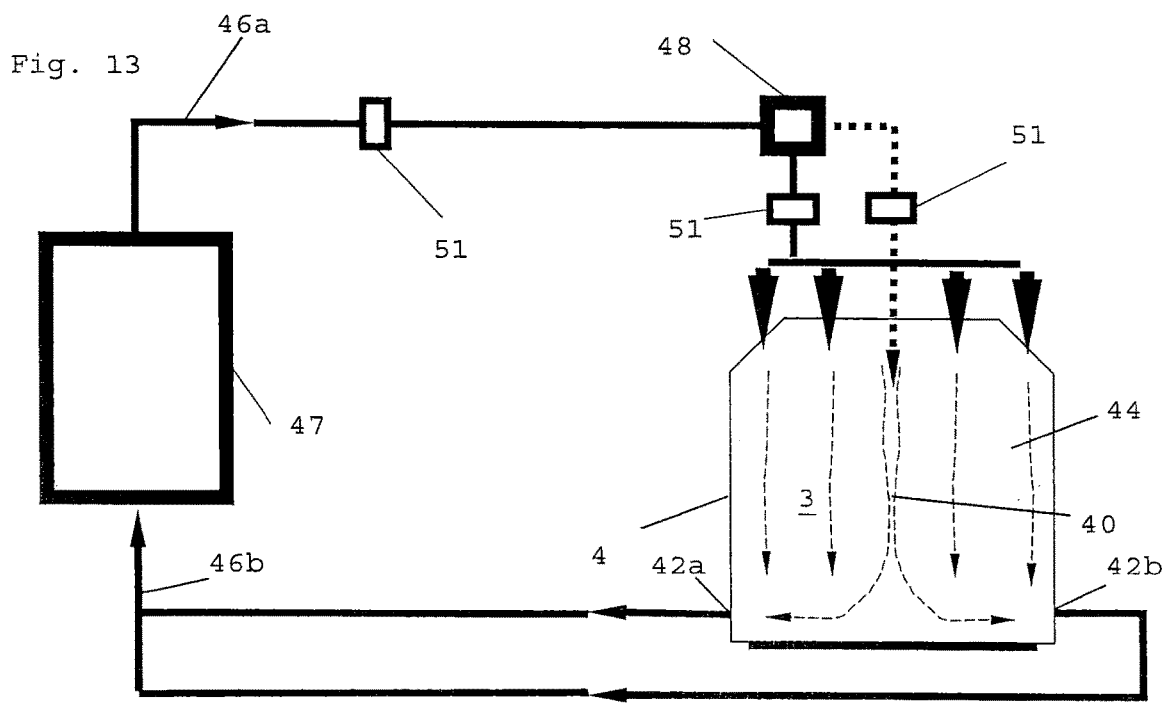
FIG. 13 is a schematic cross-sectional side view of a manufacturing apparatus according to the invention in which a central gas stream is combined with a ceiling gas stream in a process gas circuit.

FIG. 13 is a schematic cross-sectional side view of a manufacturing apparatus according to the invention in which a central gas stream is combined with a ceiling gas stream in a closed process gas circuit. The manufacturing apparatus may, for instance, possess properties described with regard to FIGS. 1-12, the process chamber 3 may, in particular, be designed similarly to that of FIG. 12a/12b.

Supply pipes 46a and discharge pipes 46b of the process gas circuit comprise a conveying unit 47, which, in this example, combines a turbine and additionally a filter in a recirculation-filter-device. The filter serves for removing impurities from the process gas discharged from the process chamber 3.

In a regulated or unregulated splitting unit 48, a process gas supplied to the process chamber 3 via ceiling inlets 45 is split into a ceiling gas stream 44 according to the invention and a central gas stream 40 (for instance, according to the first aspect of the invention). This splitting is monitored and/or regulated depending on requirements of the concrete application by using metering points 51 arranged in various supply pipe branches. The metering points may, for instance, measure the respective process gas stream. The regulation may, for example, be carried out depending on the constructional design of the process chamber 3 and/or on a concrete fabrication process.

Figure 14:
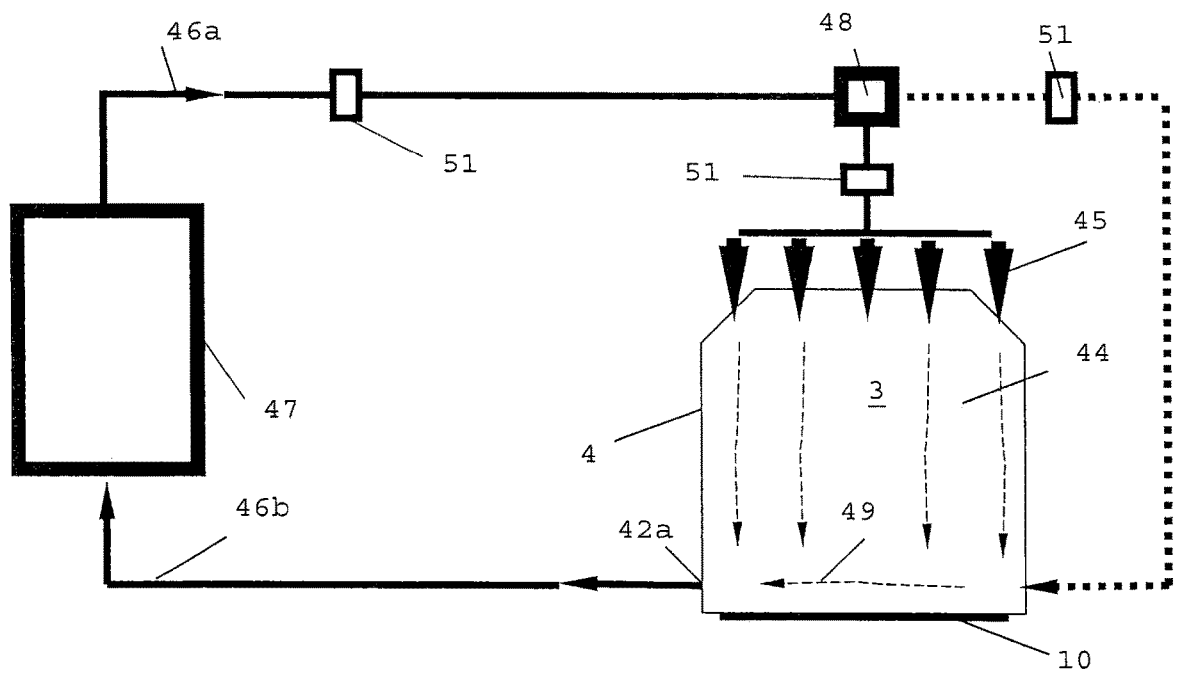
FIG. 14 is a schematic cross-sectional side view of a manufacturing apparatus according to the invention in which a lateral gas stream is combined with a ceiling gas stream in a process gas circuit.

FIG. 14 is a schematic cross-sectional side view of a manufacturing apparatus according to the invention in which a lateral gas stream is combined with a ceiling gas stream in a closed process gas circuit. The apparatus in FIG. 14 differs from the one of FIG. 13 only in that a lateral gas stream 49 is supplied to the process chamber 3 instead of the central gas stream 40.

The lateral gas stream 49 flows substantially parallel and preferably in a laminar manner above the build area 10. It is supplied to the process chamber 3 via a side inlet of the supply pipe 46a arranged at one build area side and discharged from the process chamber via an outlet of the discharge pipe 46b arranged at an opposite build area side.

Figure 15:
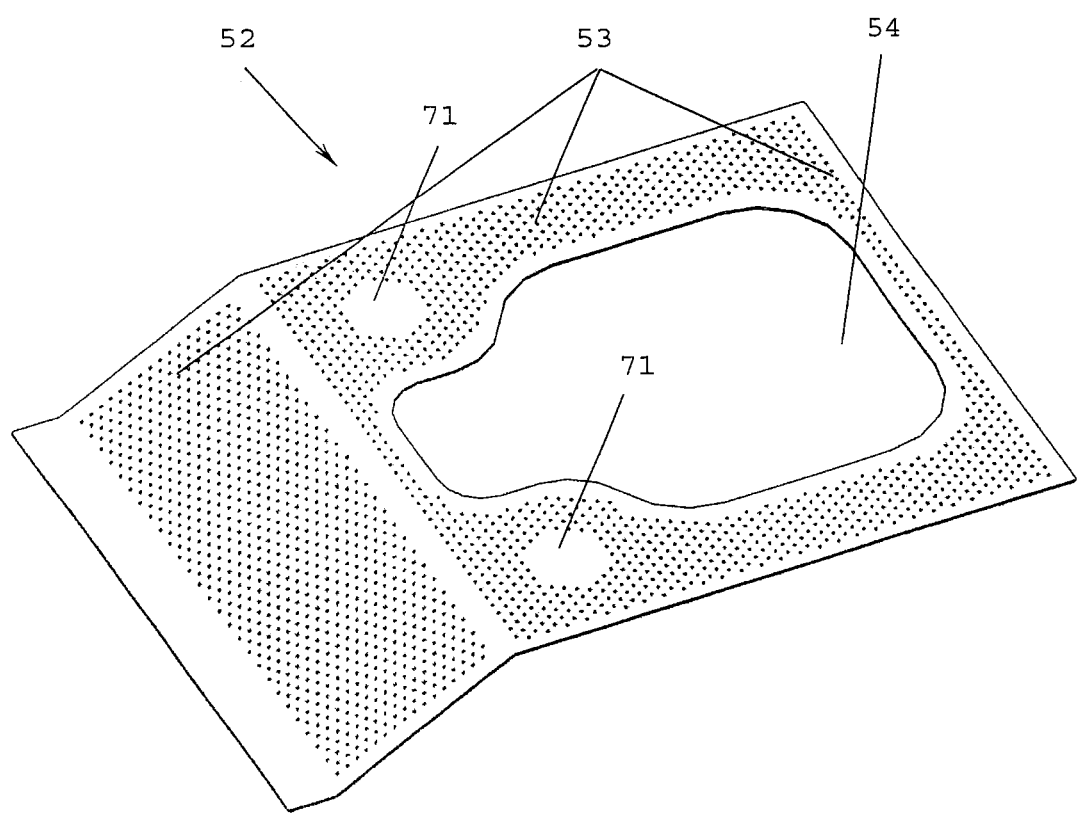
FIG. 15 is a schematic perspective view of a perforated metal plate for generating the ceiling gas stream according to the invention.

FIG. 15 is a schematic perspective view of a perforated metal plate for generating a ceiling gas stream according to the invention in a process chamber, whose ceiling has a hollow space for this (not shown). In other words, the perforated metal plate 52 in FIG. 15 is an example for an inner wall region of such a hollow space according to the invention. In this example, the perforated metal plate 52 has a plurality of holes 53 representing ceiling inlets according to the invention.

The perforated metal plate 52 further has a larger inner opening 54 in its central region which, in a built-in state of the perforated metal plate 52 in the process chamber ceiling 4a surrounds inter alia coupling windows 35a, 35b for coupling the solidification radiation into the process chamber 3. In the advantageous configuration as shown, the perforated metal plate 52 has a number of approximately 2000 holes 53 on the whole, which are distributed over the perforated metal plate 52 substantially —in particular, with the exception of the inner opening 54 as well as two approximately hexagonal areas 71 which serve as baffles for deflecting gas streams, which guide into the hollow space (not shown) of the process chamber ceiling 4a and thus provide for an equal or approximately equal velocity of the partial streams of the ceiling gas stream—uniformly since they are equally sized and arranged at regular distances from each other on average. In the course of this, here, the holes 53 have a diameter of approximately 2.5 mm. In the course of this, the ratio of an area perforated by holes 53 to a total process chamber ceiling area is approximately 3,8%.

Figure 16:
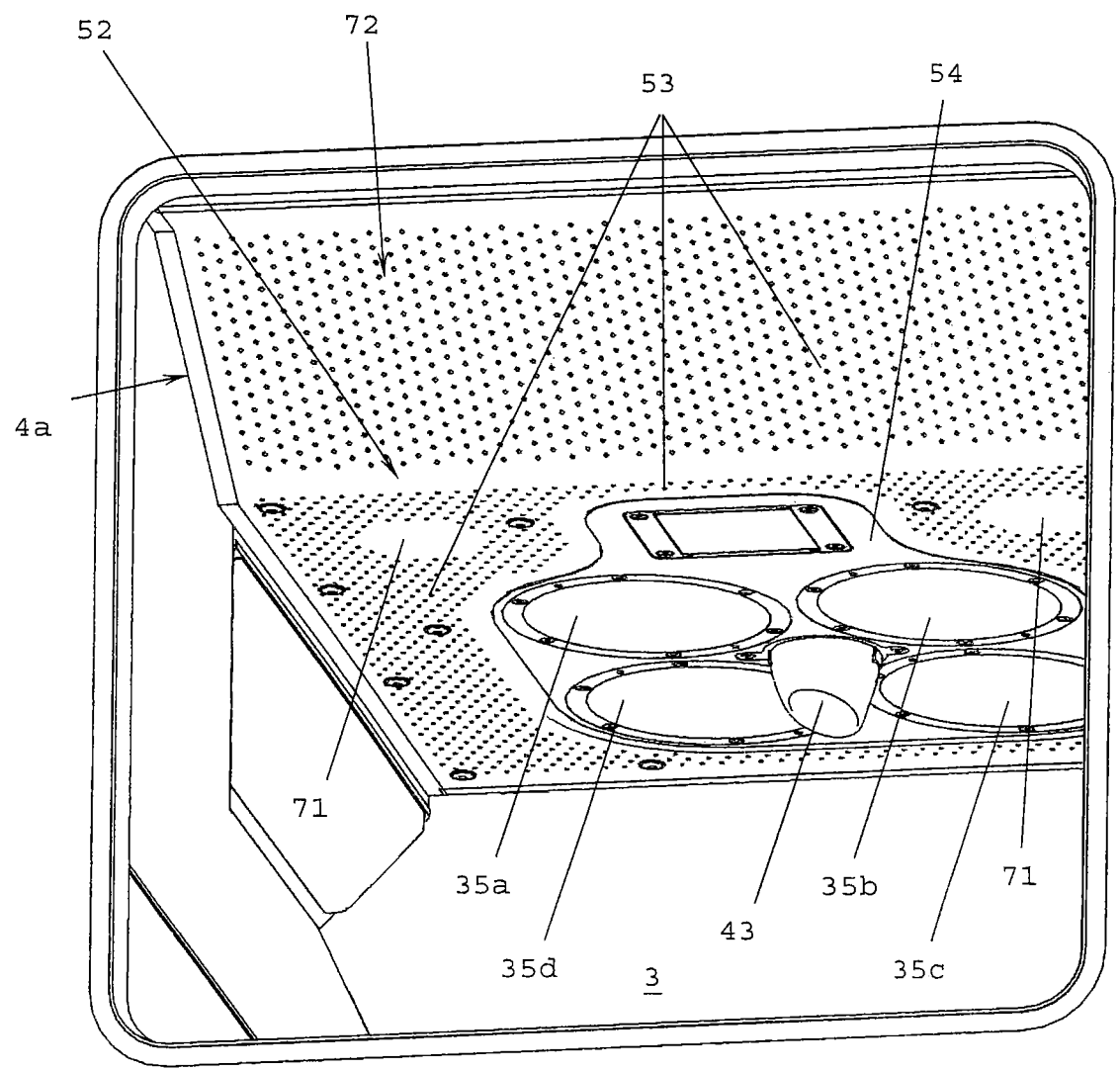
FIG. 16 is a schematic perspective view inclined from below onto the perforated metal plate of FIG. 15 in a built-in state in the ceiling of a process chamber.

FIG. 16 shows the perforated metal plate 52 of FIG. 15 in a built-in state in the ceiling 4a of a process chamber 3 in a schematic perspective view inclined from below. In this example, four coupling windows 35a, 35b, 35c, and 35d of a four-scanner-machine, which may, in particular, be an apparatus as in FIG. 2, are arranged in the process chamber ceiling 4a within the inner opening 54. Centrally between the coupling windows 35a, 35b, 35c, and 35d, a nozzle 43 is arranged, through which the central gas stream 40 (not shown) according to the invention can stream into the process chamber 3.

Figure 17:
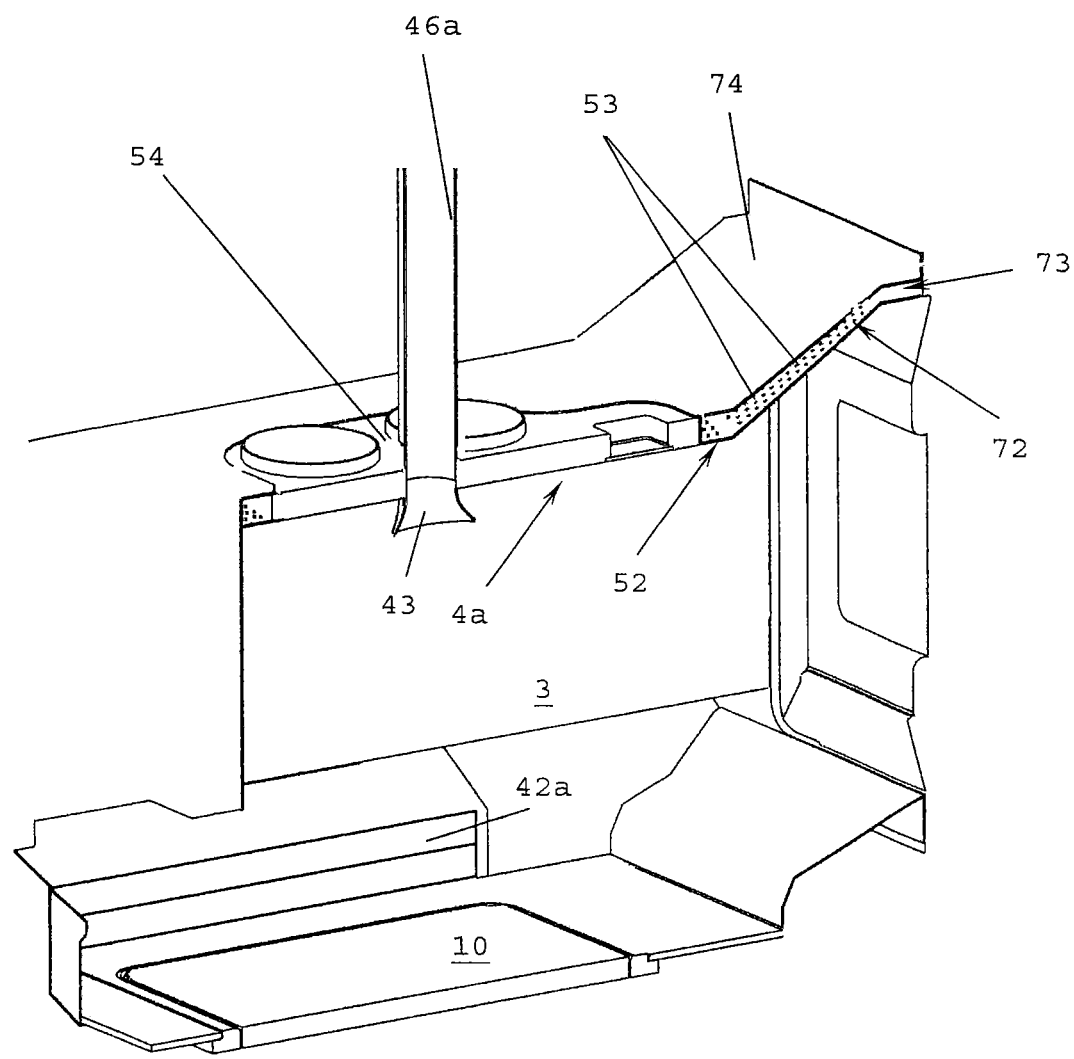
FIG. 17 is a schematic perspective view inclined from above and partly in a vertical cross-section onto a process chamber having a perforated metal plate of FIGS. 15 and 16 built-in in its ceiling.

FIG. 17 shows a process chamber 3 having a perforated metal plate 52 as in FIGS. 15 and 16 built-in in its ceiling 4a, partly in a vertical cross-section, in a schematic perspective view inclined from above. In the course of this, in particular, it may be a process chamber 3 of the four-scanner-machine 1 shown in FIG. 2. A gas supply pipe or, respectively, supply pipe 46a ends in a central gas inlet, here in form of a nozzle 43, representing the gas supply device according to the first aspect of the invention. The process chamber ceiling 4a lies above a build area 10 and comprises a hollow space 73 having a wall. This hollow space wall comprises an outer wall region 74 turned away from the process chamber 3 and an inner wall region bordering the process chamber 3, which is formed by the perforated metal plate or, respectively, the perforated plate 52. In a vertical wall section of the process chamber wall, an outlet 42a or 42b starts directly above the process chamber bottom 4b or, respectively, a plane of the build area 10, the outlet having two opening slits extending horizontally. The outlet 42a or 42b extends at a distance from an edge of the build area 10 and parallel to a side of the build area 10 and extends in this exemplary embodiment in its length beyond the side length of the build area 10 being parallel thereto, so that a removal of impurities in regions above the process chamber bottom 4b which do not lie above the build area 10 is improved.

FIGS. 15 to 17 show that a process chamber ceiling 4a does not necessarily need to be plane-shaped and/or lie parallel to the build area 10 across the whole of its area. Vertically above the build area 10, the process chamber ceiling 4a shown here is substantially plane and lies parallel thereto, it, however, has a section 72 rising up away from the process chamber bottom in a slant manner above a region of the build area edge.

This section 72 does not impair the functioning of the ceiling gas stream according to the invention, but is rather designed as the whole inlet region of the process chamber ceiling 4a such that, during operation, a homogeneous ceiling gas stream pours out from the openings 53 into the process chamber 3 substantially vertically to the build area 10. This is made possible by a defined control of a process gas volume which is pumped into the hollow space 73 of the process chamber ceiling 4a from the in this example two supply pipes (not to see in FIG. 17, arranged above the hexagonal areas 71 in FIG. 16) relatively to a process gas volume exiting the hollow space 73 through the holes 53 of the perforated plate 52 towards the process chamber 3. By a suitable setting of parameters, such as e.g. a volume flow rate of the gas stream into the hollow space 73 and/or a ratio of the areas of the opening cross-sections at in- and outlets of the hollow space 73, an overpressure relatively to the ambient pressure in the process chamber 3 can be generated during operation, preferably, in the whole region of the hollow space 73, which overpressure provides for a to a large extent equal velocity of the partial streams of the gas stream which stream through the holes 53 into the process chamber 3. In other words, a gas volume introduced into the hollow space 73 does not stream further into the process chamber on the shortest route through holes 53 of the perforated plate 52 lying close to the supply pipes, but rather firstly continuously floods the hollow space 73, so that after a short starting period, substantially in the whole hollow space 73 or, respectively, substantially at all openings 53 of the inner wall region 52 towards the process chamber 3, a substantially equal pressure, i.e. an overpressure relatively to the process chamber pressure, prevails. Such an overpressure can effect a homogeneous ceiling gas stream through the openings 53 of the inner wall region or, respectively, perforated plate 52 of the process chamber ceiling 4a, e.g. in the present exemplary embodiment of a process chamber ceiling 4a having a big number of openings 53 of equal shape and equal opening area. In this case, the partial streams of the ceiling gas stream have substantially equal velocities and a substantially equal volume stream.

An influencing factor with regard to a target homogenisation of the ceiling gas stream a hole size may be, i.e. an area and/or shape of an opening cross-section of the holes 53 in the inner wall region 52. At a constant volume flow rate of a process gas which is introduced into the hollow space 73, a characteristic of the ceiling gas stream can be purposefully changed by constructively simple means, e.g. by exchanging the inner wall region 52 of the process chamber ceiling 4a, for instance, by a perforated plate having an irregular arrangement of the holes. Partial streams of the ceiling gas stream exiting the above-described section 72 of the process chamber ceiling 4a which is slant to the build area 10, firstly traversing the holes 53 at a correspondingly acute angle to the build area 10, may be gradually guided, again, into an approximately vertical direction to the build area 10 as they pass to the build area 10, as caused by further effects, e.g. suction effects of other regions of the ceiling gas stream or a deflection by a bordering vertical region of the process chamber wall, whereby in a lower region, e.g. a lower half, of the process chamber 3, again, a ceiling gas stream is produced which is substantially vertically directed to the build area 10.

Even though the present invention has been described on the basis of a laser sintering or laser melting apparatus, it is not limited to the laser sintering or laser melting. It may be applied to arbitrary methods for generatively manufacturing a three-dimensional object by a layer-by-layer application and selective solidification of a building material (preferably in powder form), independently of the manner in which the building material is being solidified. The selective solidification of the applied building material may be performed by an energy supply of any suitable kind. Alternatively or additionally, it may, for example, also be performed by 3D-printing, for instance by applying an adhesive.

In the course of the selective solidification by an energy supply, energy may in general be supplied to the building material, for instance, by electromagnetic radiation or particle radiation. In the course of this, the radiation has such an effect on the building material in the respective region of a layer to be solidified that it changes its aggregation state, undergoes a phase transition or another structural change and, after a subsequent cooling down, is available in a solidified form. Preferably, the building material is a powder, wherein the radiation may, in particular, be a laser radiation. In this case, the radiation has such an effect on a region of the respective layer to be solidified that powder grains of the building material are partially or completely melted in this region by the energy supplied by the radiation and, after a cooling down, are interconnected forming a solid body.

A solidification device for the selective solidification by energy supply may, for instance, comprise one or more gas or solid state lasers or any other type of lasers, such as e.g. laser diodes, in particular VCSEL (Vertical Cavity Surface Emitting Laser) or VECSEL (Vertical External Cavity Surface Emitting Laser) or a row of these lasers. Generally, any device using which energy can be selectively applied to a layer of the build material as radiation may be used for the selective solidification. Instead of a laser, for instance, another light source, an electron beam, or any other energy or, respectively, radiation source may be used which is suitable for solidifying the building material. Instead of deflecting a beam, also the selective solidification using a movable line irradiation device may be applied. The invention may also be applied to the selective mask sintering, where an extended light source and a mask are used, or to the High-Speed-Sintering (HSS), where a material is selectively applied onto the building material which material enhances (absorption sintering) or reduces (inhibition sintering) the absorption of radiation at the corresponding points and then an irradiation is performed non-selectively in a large-area manner or using a movable line irradiation device.

In the context of the present invention, basically all kinds of building material suitable for the generative manufacturing may be used, in particular, plastics, metals, ceramics, respectively preferably in powder form, sand, filled or mixed powders.

The invention claimed is:

1. A method of generating a ceiling gas stream in a generative manufacturing of a three-dimensional object in a process chamber by a layer-by-layer application and selective solidification of a building material within a build area located in a process chamber bottom, the method comprising:
    providing the process chamber having a chamber wall with a process chamber ceiling lying above and extending over the build area;
    passing a ceiling gas stream of a process gas through the process chamber by streaming the ceiling gas stream from the process chamber ceiling towards the build area in a controlled manner; and
    supplying the ceiling gas stream to the process chamber through multiple ceiling inlets formed in the process chamber ceiling which are spaced apart and distributed over a region of the ceiling of the process chamber directly above the build area, with the ceiling gas stream out of the ceiling inlets combining from multiple ceiling inlet gas streams flowing from the inlets and directed to flow in a manner perpendicularly to the build area and therefore downwards onto the build area as the ceiling gas stream exits the ceiling inlets, the process chamber ceiling including at least one window for passing radiation used for the solidification of the building material into the process chamber; and
    the process chamber ceiling further having at least one central inlet in a section bordering on the at least one coupling window, the central inlet providing a central partial ceiling gas stream out therefrom towards the build area, the central partial ceiling gas stream shaped so as to widen in such a manner that the central partial ceiling gas stream converges at margins of the central partial ceiling gas stream towards adjacent inlet ceiling gas streams or overlaps with adjacent inlet ceiling gas streams at least in a lowest part of the process chamber above the build area, the ceiling gas stream and the central partial ceiling gas stream combining in a controlled manner towards the build area to generate a combined gas stream at least across the whole build area.

2. The method according to claim 1, wherein the ceiling inlets are shaped and/or arranged and/or controlled such that the ceiling gas stream is homogeneously shaped in a lowest tenth of the process chamber height; and/or
    wherein the ceiling inlets are shaped and/or arranged and/or controlled such that the ceiling gas stream is homogeneously shaped in a plane of the build area and/or parallel above the build area, the plane extending at least across the area of the build area including a surrounding area of the build area or across a total area of the process chamber bottom.

3. The method according to claim 1, wherein the process chamber bottom lies below the process chamber ceiling, and the build area extends over a partial region of the process chamber bottom, a distribution of the ceiling inlets at the process chamber ceiling is about the same in areas relative to a total area of the process chamber bottom, wherein the ceiling inlets are designed and/or arranged and/or controlled such that inlet ceiling streams of the ceiling gas stream are respectively directed perpendicularly to the build area downwards onto the process chamber bottom when the inlet ceiling streams exit the ceiling inlets.

4. The method according to claim 1, wherein the ceiling gas stream is passed through the process chamber before and/or during and/or after the selective solidification of the building material.

5. The method according to claim 1, wherein the process chamber ceiling further comprises a hollow space having a wall that is closed in an outer wall region facing away from the process chamber and that possesses ceiling inlets in an inner wall region bordering the process chamber.

6. The method according to claim 5,
    wherein the inner wall region comprises a plate or the ceiling inlets are at least partly formed by holes of the plate so as to form a perforated plate;
    wherein the plate or the perforated plate has at least 10 holes; and/or
    wherein an average opening cross-section area of the holes does not exceed 10 $cm^2$; and/or
    wherein a sum of the opening cross-section areas of the holes does not exceed 20% of a total area of the process chamber bottom.

7. The method according to claim 1, wherein at least one of the ceiling inlets and/or at least one additional gas inlet into the process chamber is designed and/or controlled such that, depending on a spatial configuration of the process chamber and/or on a position and/or size of a device arranged inside the process chamber, a velocity and/or an orientation and/or a jet cross-section of a partial ceiling gas stream streaming out of the ceiling inlet or the additional gas inlet are varied prior to and/or during and/or after the object manufacturing.

8. The method according to claim 1,
    wherein prior to and/or during and/or after the manufacturing of the object, a process gas is supplied to the process chamber in a closed process gas circuit and is discharged from the process chamber through an outlet;
    wherein the ceiling gas stream represents at least a part of the process gas circuit; and
    wherein supply and/or discharge pipes of the process gas circuit include a conveying unit that varies a velocity and/or velocity distribution and/or pressure distribution of a total process gas stream or of the ceiling gas stream in the process chamber prior to and/or during and/or after the manufacturing of the object.

9. The method of claim 8, wherein the process gas circuit further comprises at least one of the following gas streams that removes impurities generated during the solidification of the building material from the process chamber:
    a central gas stream that flows into the process chamber prior to and/or during and/or after the manufacturing of the object through a central inlet formed in the process chamber ceiling and flows out of the process chamber through at least one outlet, the central gas stream impinging within a central region of the build area at an angle of at least 45° to the build area;

a lateral gas stream that flows into the process chamber prior to and/or during and/or after the manufacturing of the object through a side inlet arranged at a build area side and flows out of the process chamber through at least one outlet arranged at an opposite side of the build area.

10. The method according to claim 8, wherein a ratio of a total inlet opening area to a total outlet opening area of the process gas circuit is varied prior to and/or during and/or after the manufacturing of the object, whereby, a velocity and/or a pressure of the process gas is/are varied at least in a partial region of the process chamber.

11. A control unit for an apparatus for generatively manufacturing a three-dimensional object, wherein the control unit is designed for generating control commands for the automatic execution of a method according to claim 1.

12. An apparatus designed and/or controlled to automatically execute the method according to claim 1.

13. The method according to claim 1, wherein the ceiling inlets are uniformly distributed over a total region of the process chamber ceiling except for a coupling window region occupied by the at least one coupling window.

* * * * *